United States Patent
Reed et al.

(10) Patent No.: US 9,693,433 B2
(45) Date of Patent: Jun. 27, 2017

(54) APPARATUS AND METHOD FOR SCHEDULE BASED OPERATION OF A LUMINAIRE

(71) Applicant: Express Imaging Systems, LLC, Renton, WA (US)

(72) Inventors: William G. Reed, Seattle, WA (US); Dale H. DeGraff, Brier, WA (US); Richard Dolf, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 0 days.

(21) Appl. No.: 14/552,274

(22) Filed: Nov. 24, 2014

(65) Prior Publication Data

US 2015/0077019 A1 Mar. 19, 2015

Related U.S. Application Data

(63) Continuation of application No. 13/604,327, filed on Sep. 5, 2012, now Pat. No. 8,896,215.

(51) Int. Cl.
*H05B 37/02* (2006.01)

(52) U.S. Cl.
CPC .......... *H05B 37/0281* (2013.01); *Y02B 20/42* (2013.01)

(58) Field of Classification Search
None
See application file for complete search history.

(56) References Cited

U.S. PATENT DOCUMENTS

| | | | |
|---|---|---|---|
| 2,240,050 A | 4/1941 | Nuebling | |
| 2,745,055 A | 5/1956 | Woerdemann | |
| 3,374,396 A | 3/1968 | Bell et al. | |
| 4,153,927 A | 5/1979 | Owens | |
| 4,237,377 A | 12/1980 | Sansum | |
| 4,663,521 A | 5/1987 | Maile | |
| 5,086,379 A | 2/1992 | Denison et al. | |
| 5,160,202 A | 11/1992 | Légaré | |

(Continued)

FOREIGN PATENT DOCUMENTS

| | | |
|---|---|---|
| CN | 103162187 A | 6/2013 |
| DE | 4001980 A1 | 8/1990 |

(Continued)

OTHER PUBLICATIONS

"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.

(Continued)

*Primary Examiner* — Crystal L Hammond
(74) *Attorney, Agent, or Firm* — Seed Intellectual Property Law Group LLP

(57) ABSTRACT

An illumination system verifies controls the operation of a luminaire without the use of any photometric data. The illumination system uses data indicative of a current time, date or latitude to determine one or more aspects of a solar event. Such aspects can include a scheduled, predicted or expected time of occurrence of the scheduled solar event. Responsive to the determination of a scheduled, predicted or expected time of occurrence of the scheduled solar event, a control subsystem can adjust the luminous output of a light source.

14 Claims, 4 Drawing Sheets

(56) References Cited

U.S. PATENT DOCUMENTS

| | | |
|---|---|---|
| 5,161,107 A | 11/1992 | Mayeaux et al. |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 5,838,226 A | 11/1998 | Houggy et al. |
| 5,869,960 A | 2/1999 | Brand |
| 5,892,331 A | 4/1999 | Hollaway |
| 5,892,335 A | 4/1999 | Archer |
| 5,936,362 A | 8/1999 | Alt et al. |
| 6,111,739 A | 8/2000 | Wu et al. |
| 6,149,283 A | 11/2000 | Conway et al. |
| 6,154,015 A | 11/2000 | Ichiba |
| 6,160,353 A | 12/2000 | Mancuso |
| 6,377,191 B1 | 4/2002 | Takubo |
| 6,612,720 B1 | 9/2003 | Beadle |
| 6,674,060 B2 | 1/2004 | Antila |
| 6,681,195 B1 | 1/2004 | Poland et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-johansen |
| 6,880,956 B2 | 4/2005 | Zhang |
| 6,902,292 B2 | 6/2005 | Lai |
| 6,985,827 B2 | 1/2006 | Williams et al. |
| 7,019,276 B2 | 3/2006 | Cloutier et al. |
| 7,066,622 B2 | 6/2006 | Alessio |
| 7,081,722 B1 | 7/2006 | Huynh et al. |
| 7,122,976 B1 | 10/2006 | Null et al. |
| 7,188,967 B2 | 3/2007 | Dalton et al. |
| 7,190,121 B2 | 3/2007 | Rose et al. |
| 7,196,477 B2 | 3/2007 | Richmond |
| 7,218,056 B1 | 5/2007 | Harwood |
| 7,239,087 B2 | 7/2007 | Ball |
| 7,252,385 B2 | 8/2007 | Engle et al. |
| 7,258,464 B2 | 8/2007 | Morris et al. |
| 7,270,441 B2 | 9/2007 | Fiene |
| 7,281,820 B2 | 10/2007 | Bayat et al. |
| 7,294,973 B2 | 11/2007 | Takahama et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Null et al. |
| 7,438,440 B2 | 10/2008 | Dorogi |
| 7,440,280 B2 | 10/2008 | Shuy |
| 7,468,723 B1 | 12/2008 | Collins |
| 7,524,089 B2 | 4/2009 | Park |
| 7,538,499 B2 | 5/2009 | Ashdown |
| 7,547,113 B2 | 6/2009 | Lee |
| 7,559,674 B2 | 7/2009 | He et al. |
| 7,564,198 B2 | 7/2009 | Yamamoto et al. |
| 7,569,802 B1 | 8/2009 | Mullins |
| 7,578,597 B2 | 8/2009 | Hoover et al. |
| 7,623,042 B2 | 11/2009 | Huizenga |
| 7,627,372 B2 | 12/2009 | Vaisnys et al. |
| 7,631,324 B2 | 12/2009 | Buonasera et al. |
| 7,633,463 B2 | 12/2009 | Negru |
| 7,638,743 B2 | 12/2009 | Bartol et al. |
| 7,677,753 B1 | 3/2010 | Wills |
| 7,688,002 B2 | 3/2010 | Ashdown et al. |
| 7,688,222 B2 | 3/2010 | Peddie et al. |
| 7,697,925 B1 | 4/2010 | Wilson et al. |
| 7,702,135 B2 | 4/2010 | Hill et al. |
| 7,703,951 B2 | 4/2010 | Piepgras et al. |
| 7,746,003 B2 | 6/2010 | Verfuerth et al. |
| D621,410 S | 8/2010 | Verfuerth et al. |
| D621,411 S | 8/2010 | Verfuerth et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,872,423 B2 | 1/2011 | Biery et al. |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,983,817 B2 | 7/2011 | Breed |
| 7,985,005 B2 | 7/2011 | Alexander et al. |
| 8,100,552 B2 | 1/2012 | Spero |
| 8,118,456 B2 | 2/2012 | Reed et al. |
| 8,143,769 B2 | 3/2012 | Li |
| 8,174,212 B2 | 5/2012 | Tziony et al. |
| 8,183,797 B2 | 5/2012 | McKinney |
| 8,207,830 B2 | 6/2012 | Rutjes et al. |
| 8,260,575 B2 | 9/2012 | Walters et al. |
| 8,290,710 B2 | 10/2012 | Cleland et al. |
| 8,344,665 B2 | 1/2013 | Verfuerth et al. |
| 8,376,583 B2 | 2/2013 | Wang et al. |
| 8,390,475 B2 | 3/2013 | Feroldi |
| 8,395,329 B2 | 3/2013 | Jutras et al. |
| 8,427,076 B2 | 4/2013 | Bourquin et al. |
| 8,436,556 B2 | 5/2013 | Eisele et al. |
| 8,445,826 B2 | 5/2013 | Verfuerth |
| 8,457,793 B2 | 6/2013 | Golding et al. |
| 8,476,565 B2 | 7/2013 | Verfuerth |
| 8,547,022 B2 | 10/2013 | Summerford et al. |
| 8,586,902 B2 | 11/2013 | Verfuerth |
| 8,604,701 B2 | 12/2013 | Verfuerth et al. |
| 8,674,608 B2 | 3/2014 | Holland et al. |
| 8,749,403 B2 | 6/2014 | King et al. |
| 8,749,635 B2 | 6/2014 | Högasten et al. |
| 8,764,237 B2 | 7/2014 | Wang et al. |
| 8,779,340 B2 | 7/2014 | Verfuerth et al. |
| 8,779,686 B2 | 7/2014 | Jin |
| 8,866,392 B2 | 10/2014 | Chen |
| 8,866,582 B2 | 10/2014 | Verfuerth et al. |
| 8,884,203 B2 | 11/2014 | Verfuerth et al. |
| 8,896,215 B2 | 11/2014 | Reed et al. |
| 8,921,751 B2 | 12/2014 | Verfuerth |
| 8,975,827 B2 | 3/2015 | Chobot et al. |
| 8,988,005 B2 | 3/2015 | Jungwirth et al. |
| 9,002,522 B2 | 4/2015 | Mohan et al. |
| 9,024,545 B2 * | 5/2015 | Bloch ................ H05B 37/0281 301/116 |
| 9,084,310 B2 | 7/2015 | Bedell et al. |
| 9,107,026 B1 | 8/2015 | Viswanadham et al. |
| 9,119,270 B2 | 8/2015 | Chen et al. |
| 9,312,451 B2 | 4/2016 | Reed et al. |
| 9,357,618 B2 | 5/2016 | Pandharipande et al. |
| 2002/0084767 A1 | 7/2002 | Arai |
| 2003/0016143 A1 | 1/2003 | Ghazarian |
| 2003/0184672 A1 | 10/2003 | Wu et al. |
| 2004/0192227 A1 | 9/2004 | Beach et al. |
| 2005/0117344 A1 | 6/2005 | Bucher et al. |
| 2005/0174762 A1 | 8/2005 | Fogerlie |
| 2005/0179404 A1 | 8/2005 | Veskovic et al. |
| 2005/0231133 A1 | 10/2005 | Lys |
| 2006/0014118 A1 | 1/2006 | Utama |
| 2006/0066264 A1 | 3/2006 | Ishigaki et al. |
| 2006/0098440 A1 | 5/2006 | Allen |
| 2006/0146652 A1 | 7/2006 | Huizi et al. |
| 2006/0208667 A1 | 9/2006 | Lys et al. |
| 2007/0032990 A1 | 2/2007 | Williams et al. |
| 2007/0102033 A1 | 5/2007 | Petrocy |
| 2007/0164689 A1 | 7/2007 | Suzuki |
| 2007/0224461 A1 | 9/2007 | Oh |
| 2007/0225933 A1 | 9/2007 | Shimomura |
| 2008/0018261 A1 | 1/2008 | Kastner |
| 2008/0025020 A1 | 1/2008 | Kolb |
| 2008/0043106 A1 | 2/2008 | Hassapis et al. |
| 2008/0062687 A1 | 3/2008 | Behar et al. |
| 2008/0094000 A1 * | 4/2008 | Yamamoto et al. ......... 315/250 |
| 2008/0130304 A1 | 6/2008 | Rash et al. |
| 2008/0215279 A1 | 9/2008 | Salsbury et al. |
| 2008/0224623 A1 | 9/2008 | Yu |
| 2008/0232116 A1 | 9/2008 | Kim |
| 2008/0248837 A1 | 10/2008 | Kunkel |

(56) References Cited

U.S. PATENT DOCUMENTS

| | | |
|---|---|---|
| 2008/0266839 A1 | 10/2008 | Claypool et al. |
| 2008/0291661 A1 | 11/2008 | Martin |
| 2009/0046151 A1 | 2/2009 | Nagaoka et al. |
| 2009/0058320 A1 | 3/2009 | Chou et al. |
| 2009/0129067 A1 | 5/2009 | Fan et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195162 A1 | 8/2009 | Maurer et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0273290 A1 | 11/2009 | Ziegenfuss |
| 2009/0278479 A1 | 11/2009 | Platner et al. |
| 2009/0284155 A1 | 11/2009 | Reed et al. |
| 2009/0284366 A1* | 11/2009 | Haartsen .............. G01S 1/70 340/531 |
| 2009/0315485 A1* | 12/2009 | Verfuerth et al. .......... 315/320 |
| 2010/0001652 A1 | 1/2010 | Damsleth |
| 2010/0052557 A1 | 3/2010 | Van Der Veen et al. |
| 2010/0090577 A1 | 4/2010 | Reed et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1 | 7/2010 | Draper et al. |
| 2010/0237711 A1* | 9/2010 | Parsons ............ H05B 37/0227 307/116 |
| 2010/0244708 A1 | 9/2010 | Cheung et al. |
| 2010/0259193 A1 | 10/2010 | Umezawa et al. |
| 2010/0270945 A1 | 10/2010 | Chang et al. |
| 2010/0271802 A1 | 10/2010 | Recker et al. |
| 2010/0277082 A1 | 11/2010 | Reed et al. |
| 2010/0295454 A1 | 11/2010 | Reed |
| 2010/0295455 A1 | 11/2010 | Reed |
| 2010/0295946 A1 | 11/2010 | Reed et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0175518 A1 | 7/2011 | Reed et al. |
| 2011/0204845 A1 | 8/2011 | Paparo et al. |
| 2011/0215731 A1 | 9/2011 | Jeong et al. |
| 2011/0215751 A1 | 9/2011 | Sato |
| 2011/0221346 A1 | 9/2011 | Lee et al. |
| 2011/0248812 A1 | 10/2011 | Hu et al. |
| 2011/0251751 A1 | 10/2011 | Knight |
| 2011/0282468 A1 | 11/2011 | Ashdown |
| 2011/0288658 A1* | 11/2011 | Walters ............... G06Q 30/04 700/12 |
| 2011/0310605 A1 | 12/2011 | Renn et al. |
| 2012/0001566 A1* | 1/2012 | Josefowicz ........ H05B 33/0851 315/291 |
| 2012/0019971 A1 | 1/2012 | Flaherty et al. |
| 2012/0038490 A1 | 2/2012 | Verfuerth |
| 2012/0098439 A1 | 4/2012 | Recker et al. |
| 2012/0119669 A1 | 5/2012 | Melanson et al. |
| 2012/0119682 A1 | 5/2012 | Warton |
| 2012/0143383 A1 | 6/2012 | Cooperrider et al. |
| 2012/0153854 A1 | 6/2012 | Setomoto et al. |
| 2012/0169053 A1 | 7/2012 | Tchoryk, Jr. et al. |
| 2012/0169239 A1 | 7/2012 | Chen et al. |
| 2012/0181935 A1 | 7/2012 | Velazquez |
| 2012/0194054 A1 | 8/2012 | Johnston et al. |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0242254 A1 | 9/2012 | Kim et al. |
| 2012/0262069 A1 | 10/2012 | Reed |
| 2012/0286770 A1 | 11/2012 | Schröder et al. |
| 2013/0033183 A1 | 2/2013 | Verfuerth et al. |
| 2013/0043792 A1 | 2/2013 | Reed |
| 2013/0049613 A1 | 2/2013 | Reed |
| 2013/0057158 A1 | 3/2013 | Josefowicz et al. |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0141010 A1 | 6/2013 | Reed et al. |
| 2013/0154488 A1 | 6/2013 | Sadwick et al. |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0249479 A1 | 9/2013 | Partovi |
| 2013/0340353 A1 | 12/2013 | Whiting et al. |
| 2014/0001961 A1 | 1/2014 | Anderson et al. |
| 2014/0028200 A1 | 1/2014 | Van Wagoner et al. |
| 2014/0070964 A1 | 3/2014 | Rupprath et al. |
| 2014/0078308 A1 | 3/2014 | Verfuerth |
| 2014/0097759 A1 | 4/2014 | Verfuerth et al. |
| 2014/0166447 A1* | 6/2014 | Thea ................ H01H 43/02 200/19.01 |
| 2014/0203714 A1 | 7/2014 | Zhang et al. |
| 2014/0244044 A1 | 8/2014 | Davis et al. |
| 2014/0265894 A1 | 9/2014 | Weaver |
| 2014/0265897 A1 | 9/2014 | Taipale et al. |
| 2014/0313719 A1 | 10/2014 | Wang et al. |
| 2014/0320027 A1 | 10/2014 | Reed |
| 2014/0359078 A1 | 12/2014 | Liu |
| 2015/0015716 A1 | 1/2015 | Reed et al. |
| 2015/0069920 A1 | 3/2015 | Denteneer et al. |
| 2015/0123563 A1 | 5/2015 | Dahlen |
| 2015/0208479 A1 | 7/2015 | Radermacher et al. |
| 2015/0280782 A1 | 10/2015 | Airbinger et al. |
| 2015/0312983 A1 | 10/2015 | Hu et al. |
| 2016/0021713 A1 | 1/2016 | Reed |

FOREIGN PATENT DOCUMENTS

| | | |
|---|---|---|
| EP | 1 734 795 A1 | 12/2006 |
| EP | 2 320 713 A2 | 5/2011 |
| EP | 2 559 937 A1 | 2/2013 |
| EP | 2 629 491 A1 | 8/2013 |
| EP | 1 459 600 B1 | 2/2014 |
| EP | 2 781 138 A1 | 9/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-529177 A | 7/2008 |
| JP | 2008-535279 A | 8/2008 |
| JP | 2010-504628 A | 2/2010 |
| KR | 2005078403 A | 8/2005 |
| KR | 10-2006-0071869 A | 6/2006 |
| KR | 10-2006-0086254 A | 7/2006 |
| KR | 10-2008-0100140 A | 11/2008 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2005/003625 A1 | 1/2005 |
| WO | 2006/057866 A2 | 6/2006 |
| WO | 2007/023454 A1 | 3/2007 |

(56) References Cited

FOREIGN PATENT DOCUMENTS

| WO | 2007/036873 A2 | 4/2007 |
|---|---|---|
| WO | 2008/030450 A2 | 3/2008 |
| WO | 2008/034242 A1 | 3/2008 |
| WO | 2009/040703 A2 | 4/2009 |
| WO | 2010/086757 A1 | 8/2010 |
| WO | 2010/133719 A1 | 11/2010 |
| WO | 2011/063302 A2 | 5/2011 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078554 A1 | 5/2014 |

OTHER PUBLICATIONS

EE Herald, "Devices to protect High brightness LED from ESD," dated Mar. 16, 2009, retrieved Jun. 10, 2011, retrieved from http://www.eeherald.com/section/new-products/np100779.html, 1 page.
Extended European Search Report, dated Aug. 13, 2014, for corresponding European Application No. 09826926.9, 8 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report, mailed Dec. 13, 2010 for PCT/US2010/035649, 3 pages.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Jul. 9, 2009 for PCT/US2009/043171, 5 pages.
International Search Report, mailed Jun. 21, 2010 for PCT/US2009/064625, 3 pages.
International Search Report, mailed Sep. 30, 2011 for PCT/US2011/021359, 3 pages.
International Search Report, mailed Oct. 8, 2012 for PCT/US2012/033059, 3 pages.
International Search Report, mailed Jan. 14, 2013 for PCT/US2012/052009, 3 pages.
International Search Report, mailed Feb. 27, 2013 for PCT/US2012/065476, 3 pages.
International Search Report, mailed Nov. 19, 2013 for PCT/US2013/052092, 4 pages.
International Search Report, mailed Dec. 30, 2013 for PCT/US2013/058266, 3 pages.
International Search Report, mailed Feb. 26, 2014, for PCT/US2013/070794, 3 pages.
International Search Report mailed Nov. 11, 2014, for International Application No. PCT/US2014/047867, 3 pages.
Japanese Office Action, dated Jan. 6, 2015, for corresponding Japanese Application No. 2011-536564, 6 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Panasonic Electronic Components, "LED Lighting Solutions," 2009, 6 pages.
Poplawski, "Exploring Flicker & LEDs," 2010 DOE SSL Market Introduction Workshop, U.S. Department of Energy, Jul. 22, 2010, 16 pages.
Reed et al., "Adjustable Output Solid-State Lamp With Security Features," U.S. Appl. No. 61/561,616, filed Nov. 18, 2011, 33 pages.
Reed et al., "Adjustable Output Solid-State Lamp With Security Features," Office Action mailed Feb. 27, 2014, for U.S. Appl. No. 13/679,687, 11 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," Notice of Allowance mailed Aug. 29, 2014, for U.S. Appl. No. 13/679,687, 9 pages.
Reed et al., "Apparatus and Method for Schedule Based Operation of a Luminaire," Office Action mailed Mar. 26, 2014, for U.S. Appl. No. 13/604,327, 10 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance mailed Jul. 7, 2014, for U.S. Appl. No. 13/604,327, 8 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Apparatus and Method of Operating a Luminaire," U.S. Appl. No. 13/558,191, filed Jul. 25, 2012, 84 pages.
Reed et al., "Apparatus and Method of Operating a Luminaire," Office Action mailed Dec. 22, 2014, for U.S. Appl. No. 13/558,191, 17 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement," U.S. Appl. No. 61/052,924, filed May 13, 2008, 32 pages.
Reed et al., "Gas-Discharge Lamp Replacement With Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Long-Range Motion Detection for Illumination Control," Office Action mailed Jan. 30, 2014, for U.S. Appl. No. 12/784,080, 26 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Notice of Allowance mailed Jun. 20, 2014, for U.S. Appl. No. 12/784,080, 7 pages.
Reed et al., "Low-Profile Pathway Illumination System," U.S. Appl. No. 61/051,619, filed May 8, 2008, 25 pages.
Reed et al., "Low-Profile Pathway Illumination System," Office Action, dated May 5, 2011, for U.S. Appl. No. 12/437,472, 24 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," Notice of Allowance, dated Oct. 14, 2011, for U.S. Appl. No. 12/437,472, 9 pages.

(56) References Cited

OTHER PUBLICATIONS

Reed et al., "Remotely Adjustable Solid-State Lamp," U.S. Appl. No. 61/641,781, filed May 2, 2012, 65 pages.
Reed et al., "Remotely Adjustable Solid-State Lamp," U.S. Appl. No. 13/875,130, filed May 1, 2013, 65 pages.
Reed et al., "Systems and Methods That Employ Object Recognition," Office Action mailed Aug. 25, 2014, for U.S. Appl. No. 13/411,321, 35 pages.
Reed et al., "Systems and Methods That Employ Object Recognition," Amendment filed Nov. 21, 2014, for U.S. Appl. No. 13/411,321, 20 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," U.S. Appl. No. 61/567,308, filed Dec. 6, 2011, 49 pages.
Reed, "Adjustable Output Solid-State Lighting Device," Office Acton mailed Jan. 2, 2015, for U.S. Appl. No. 13/707,123, 24 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," U.S. Appl. No. 13/943,537, filed Jul. 16, 2013, 67 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination," U.S. Appl. No. 14/329,508, filed Jul. 11, 2014, 61 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination Using Received Signals ," U.S. Appl. No. 13/085,301, filed Apr. 12, 2011, 99 pages.
Reed, "Apparatus and Method of Energy Efficient Illumination Using Received Signals," Office Action mailed Oct. 1, 2013, for U.S. Appl. No. 13/085,301, 11 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination Using Received Signals," Office Action mailed Apr. 23, 2014, for U.S. Appl. No. 13/085,301, 12 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Apparatus and Method of Energy Efficient Illumination Using Received Signals," U.S. Appl. No. 14/557,275, filed Dec. 1, 2014, 92 pages.
Reed, "Asset Management System for Outdoor Luminaires," U.S. Appl. No. 62/082,463, filed Nov. 20, 2014, 56 pages.
Reed, "Centralized Control Area Lighting Hours of Illumination," U.S. Appl. No. 62/057,419, filed Sep. 30, 2014, 39 pages.
Reed, "Detection and Correction of Faulty Photo Controls in Outdoor Luminaires," U.S. Appl. No. 62/068,517, filed Oct. 24, 2014, 47 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electronic Control to Regulate Power for Solid-State Lighting and Methods Thereof," Office Action mailed Mar. 26, 2014, for U.S. Appl. No. 12/619,535, 16 pages.
Reed, "Electronic Control to Regulate Power for Solid-State Lighting and Methods Thereof," Amendment filed May 27, 2014, for U.S. Appl. No. 12/619,535, 22 pages.
Reed, "Electronic Control to Regulate Power for Solid-State Lighting and Methods Thereof," Office Action mailed Aug. 14, 2014, for U.S. Appl. No. 12/619,535, 16 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Electrostatic Discharge Protection for Luminaire," U.S. Appl. No. 13/212,074, filed Aug. 17, 2011, 30 pages.
Reed, "Electrostatic Discharge Protection for Luminaire," Office Action mailed Mar. 15, 2013, for U.S. Appl. No. 13/212,074, 11 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "High Efficiency Power Controller for Luminaire," U.S. Appl. No. 61/905,699, filed Nov. 18, 2013, 5 pages.
Reed, "High Efficiency Power Controller for Luminaire," U.S. Appl. No. 14/546,354, filed Nov. 18, 2014, 33 pages.
Reed, "Luminaire With Ambient Sensing and Autonomous Control Capabilities," U.S. Appl. No. 61/728,150, filed Nov. 19, 2012, 83 pages.

(56) References Cited

OTHER PUBLICATIONS

Reed, "Luminaire With Ambient Sensing and Autonomous Control Capabilities," U.S. Appl. No. 13/786,332, filed Mar. 5, 2013, 86 pages.
Reed, "Luminaire With Ambient Sensing and Autonomous Control Capabilities," Office Action mailed Dec. 17, 2014, for U.S. Appl. No. 13/786,332, 20 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Atmospheric Electrical Activity Detection and Visual Alert Capabilities," U.S. Appl. No. 13/786,114, filed Mar. 5, 2013, 52 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
Reed, "Luminaire With Switch-Mode Converter Power Monitoring," U.S. Appl. No. 61/723,675, filed Nov. 7, 2012, 73 pages.
Reed, "Luminaire With Switch-Mode Converter Power Monitoring," U.S. Appl. No. 14/074,166, filed Nov. 7, 2013, 73 pages.
Reed, "Photocontrol for Luminaire Consumes Very Low Power," U.S. Appl. No. 61/849,841, filed Jul. 24, 2013, 41 pages.
Reed, "Photocontrol for Luminaire Consumes Very Low Power," U.S. Appl. No. 14/158,630, filed Jan. 17, 2014, 71 pages.
Reed, "Resonant Network for Reduction of Flicker Perception in Solid State Lighting Systems," U.S. Appl. No. 61/527,029, filed Aug. 24, 2011, 41 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Hospitality Lamp," U.S. Appl. No. 61/692,619, filed Aug. 23, 2012, 32 pages.
Reed, "Solid State Hospitality Lamp," U.S. Appl. No. 13/973,696, filed Aug. 22, 2013, 32 pages.
Reed, "Solid State Lighting, Drive Circuit and Method of Driving Same," U.S. Appl. No. 61/640,963, filed May 1, 2012, 24 pages.
Reed, "Solid State Lighting, Drive Circuit and Method of Driving Same," U.S. Appl. No. 13/875,000, filed May 1, 2013, 24 pages.
Reed, "Systems, Methods, and Apparatuses for Using a High Current Switching Device as a Logic Level Sensor," U.S. Appl. No. 61/764,395, filed Feb. 13, 2013, 48 pages.
Reed, "Systems, Methods, and Apparatuses for Using a High Current Switching Device as a Logic Level Sensor," U.S. Appl. No. 14/179,737, filed Feb. 13, 2014, 48 pages.
Renn et al., "Solid State Lighting Device and Method Employing Heat Exchanger Thermally Coupled Circuit Board," U.S. Appl. No. 61/357,421, filed Jun. 22, 2010, 49 pages.
Renesas Electronics, "Zener Diodes for Surge Absorption—Applications of high-intensity LED," Apr. 2010, 1 page.
Tyco Electronics, "Circuit Protection," retrieved Jun. 10, 2011, retrieved from http://www.tycoelectronics.com/en/products/circuit-protection.html, 2 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion mailed Sep. 30, 2011 for PCT/US2011/021359, 4 pages.
Written Opinion, mailed Oct. 8, 2012 for PCT/US2012/033059, 3 pages.
Written Opinion, mailed Jan. 14, 2013 for PCT/US2012/052009, 5 pages.
Written Opinion, mailed Feb. 27, 2013 for PCT/US2012/065476, 8 pages.
Written Opinion, mailed Nov. 19, 2013 for PCT/US2013/052092, 7 pages.
Written Opinion, mailed Dec. 30, 2013 for PCT/US2013/058266, 8 pages.
Written Opinion, mailed Feb. 26, 2014, for PCT/US2013/070794, 10 pages.
Written Opinion mailed Nov. 11, 2014, for International Application No. PCT/US2014/047867, 5 pages.
Reed et al., "Apparatus and Method of Operating a Luminaire," Amendment filed Mar. 19, 2015, for U.S. Appl. No. 13/558,191, 20 pages.
Reed et al., "Systems and Methods That Employ Object Recognition," Office Action mailed Feb. 9, 2015, for U.S. Appl. No. 13/411,321, 40 pages.
Reed, "Adjustable Output Solid-State Lighting Device," Amendment filed Apr. 2, 2015, for U.S. Appl. No. 13/707,123, 14 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 14/609,168, filed Jan. 29, 2015, 77 pages.
Reed, "Low Power Photocontrol for Luminaire," U.S. Appl. No. 62/137,666, filed Mar. 24, 2015, 36 pages.
Reed, "Luminaire With Adjustable Illumination Pattern," U.S. Appl. No. 62/114,826, filed Feb. 11, 2015, 68 pages.
Reed, "Luminaire With Ambient Sensing and Autonomous Control Capabilities," Amendment filed Mar. 13, 2015, for U.S. Appl. No. 13/786,332, 23 pages.
Extended European Search Report dated Jan. 4, 2016, for corresponding EP Application No. 13823055.2—1802, 7 pages.
Extended European Search Report dated Oct. 21, 2015, for corresponding EP Application No. 13835001.2—1802, 7 pages.
Extended European Search Report, dated Apr. 11, 2016, for corresponding European Application No. 16152644.7, 8 pages.
Extended European Search Report, dated May 3, 2016, for corresponding European Application No. 12771286.7, 9 pages.
Extended European Search Report, dated Oct. 15, 2015, for corresponding European Application No. 12825132.9—1802, 5 pages.
Extended European Search Report, dated Sep. 28, 2015, for corresponding European Application No. 12850159.0—1802, 6 pages.
International Search Report and Written Opinion, mailed Feb. 29, 2015, for PCT/US2015/053000, 20 pages.
International Search Report and Written Opinion, mailed Feb. 29, 2015, for PCT/US2015/053006, 21 pages.
International Search Report and Written Opinion, mailed Jan. 13, 2016. For PCT/US2015/053009, 15 pages.
International Search Report and Written Opinion, mailed May 7, 2015, for International Application No. PCT/US2015/013512, 15 pages.
Korean Office Action with English Translation, dated Nov. 18, 2015, for corresponding KR Application No. 10-2011-7014088, 14 pages.
Reed , "Luminaire With Ambient Sensing and Autonomous Control Capabilities," Notice of Allowance mailed Aug. 6, 2015, for U.S. Appl. No. 13/786,332, 9 pages.
Reed et al., "Apparatus and Method of Operating a Luminaire," Notice of Allowance mailed Apr. 27, 2015, for U.S. Appl. No. 13/558,191, 8 pages.
Reed et al., "Long-Range Motion Detection for Illumination Control," Office Action mailed Sep. 17, 2015, for U.S. Appl. No. 14/500,512, 17 pages.
Reed et al., "Long-Range Motion Detection for Illumination Control," Amendment filed Dec. 10, 2015, for U.S. Appl. No. 14/500,512, 18 pages.
Reed et al., "Long-Range Motion Detection for Illumination Control," Office Action mailed Mar. 4, 2016, for U.S. Appl. No. 14/500,512, 18 pages.
Reed et al., "Luminaire With Adjustable Illumination Pattern," U.S. Appl. No. 14/939,856, filed Nov. 12, 2015, 69 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Amendment filed Jul. 20, 2015, for U.S. Appl. No. 13/875,130, 15 pages.

(56) References Cited

OTHER PUBLICATIONS

Reed et al., "Remotely Adjustable Solid-State Lamp," Corrected Notice of Allowance, mailed Aug. 12, 2015, and Notice of Allowance, mailed Jul. 31, 2015 for U.S. Appl. No. 13/875,130, 11 pages.
Reed et al., "Remotely Adjustable Solid-State Lamp," Office Action mailed Apr. 21, 2015, for U.S. Appl. No. 13/875,130, 10 pages.
Reed et al., "Systems and Methods That Employ Object Recognition," Amendment filed May 6, 2015, for U.S. Appl. No. 13/411,321, 20 pages.
Reed et al., "Systems and Methods That Employ Object Recognition," Amendment filed Jul. 7, 2015, for U.S. Appl. No. 13/411,321, 21 pages.
Reed et al., "Systems and Methods That Employ Object Recognition," Office Action mailed Dec. 7, 2015, for U.S. Appl. No. 13/411,321, 47 pages.
Reed et al., "Systems and Methods That Employ Object Recognition," Amendment filed Mar. 7, 2016, for U.S. Appl. No. 13/411,321, 16 pages.
Reed, "Adjustable Output Solid-State Lighting Device," Amendment filed Jan. 8, 2016, for U.S. Appl. No. 13/707,123, 11 pages.
Reed, "Adjustable Output Solid-State Lighting Device," Notice of Allowance mailed Feb. 25, 2016, for U.S. Appl. No. 13/707,123, 9 pages.
Reed, "Adjustable Output Solid-State Lighting Device," Office Action mailed Oct. 5, 2015, for U.S. Appl. No. 13/707,123, 24 pages.
Reed, "Asset Management System for Outdoor Luminaires," U.S. Appl. No. 14/869,501, filed Sep. 29, 2015, 57 pages.
Reed, "Centralized Control Area Lighting Hours of Illumination," U.S. Appl. No. 14/869,511, filed Sep. 29, 2015, 39 pages.
Reed, "Centralized Control of Area Lighting Hours of Illumination," Office Action mailed Mar. 24, 2016 for U.S. Appl. No. 14/869,511, 31 pages.
Reed, "Detection and Correction of Faulty Photo Controls in Outdoor Luminaires," U.S. Appl. No. 62/183,505, filed Jun. 23, 2015, 71 pages.
Reed, "Detection and Correction of Faulty Photo Controls in Outdoor Luminaires," U.S. Appl. No. 14/869,492, filed Sep. 29, 2015, 71 pages.
Reed, "Electronic Control to Regulate Power for Solid-State Lighting and Methods Thereof," Notice of Allowance mailed Apr. 23, 2015, for U.S. Appl. No. 12/619,535, 8 pages.
Reed, "Electronic Control to Regulate Power for Solid-State Lighting and Methods Thereof," Office Action mailed May 9, 2016 for U.S. Appl. No. 14/806,500, 18 pages.
Reed, "High Efficiency Power Controller for Luminaire," Amendment filed Feb. 9, 2016, for U.S. Appl. No. 14/546,354, 11 pages.
Reed, "High Efficiency Power Controller for Luminaire," Notice of Allowance mailed Apr. 11, 2016, for U.S. Appl. No. 14/546,354, 5 pages.
Reed, "High Efficiency Power Controller for Luminaire," Office Action mailed Sep. 10, 2015, for U.S. Appl. No. 14/546,354, 15 pages.
Reed, "Low Power Photocontrol for Luminaire," Office Action mailed Apr. 27, 2016, for U.S. Appl. No. 14/844,944, 10 pages.
Reed, "Low Power Photocontrol for Luminaire," U.S. Appl. No. 14/844,944, filed Sep. 3, 2015, 45 pages.
Reed, "Low Power Photocontrol for Luminaire," U.S. Appl. No. 14/994,569, filed Jan. 13, 2016, 36 pages.

Reed, "Luminaire With Ambient Sensing and Autonomous Control Capabilities," Office Action mailed May 29, 2015, for U.S. Appl. No. 13/786,332, 7 pages.
Reed, "Luminaire With Ambient Sensing and Autonomous Control Capabilities," Amendment filed Jul. 23, 2015, for U.S. Appl. No. 13/786,332, 17 pages.
Reed, "Luminaire With Ambient Sensing and Autonomous Control Capabilities," U.S. Appl. No. 14/950,823, filed Nov. 24, 2015, 72 pages.
Reed, "Luminaire With Ambient Sensing and Autonomous Control Capabilities," Notice of Allowance mailed May 4, 2016, for U.S. Appl. No. 14/950,823, 10 pages.
Reed, "Luminaire With Switch-Mode Converter Power Monitoring," Notice of Allowance mailed Nov. 18, 2015, for U.S. Appl. No. 14/074,166, 9 pages.
Reed, "Solid State Hospitality Lamp," Office Action mailed Apr. 15, 2016, for U.S. Appl. No. 13/973,696, 11 pages.
Reed, "Solid State Lighting, Drive Circuit and Method of Driving Same," Notice of Allowance Mailed Aug. 4, 2015, for U.S. Appl. No. 13/875,000, 10 pages.
Reed, "Systems, Methods, and Apparatuses for Using a High Current Switching Device as a Logic Level Sensor," Notice of Allowance for U.S. Appl. No. 14/179,737, mailed Nov. 6, 2015, 9 pages.
Korean Office Action with English Translation, dated May 16, 2016, for corresponding KR Application No. 10-2011-7014088, 22 pages.
Reed et al., "Apparatus and Method for Schedule Based Operation of a Luminaire," Amendment filed Jun. 7, 2016, for U.S. Appl. No. 14/552,274, 14 pages.
Reed, "Detection and Correction of Faulty Photo Controls in Outdoor Luminaires," Notice of Allowance mailed May 19, 2016 for U.S. Appl. No. 14/869,492, 9 pages.
Reed, "Low Power Photocontrol for Luminaire," Amendment filed Jun. 13, 2016, for U.S. Appl. No. 14/844,944, 10 pages.
Notice of Allowance mailed Oct. 5, 2016 for U.S. Appl. No. 14/869,511, Reed, "Centralized Control of Area Lighting Hours of Illumination," 8 pages.
Office Action mailed Jan. 18, 2017 for U.S. Appl. No. 14/806,500, Reed, "Electronic Control to Regulate Power for Solid-State Lighting and Methods Thereof," 18 pages.
Reed, "Electronic Control to Regulate Power for Solid-State Lighting and Methods Thereof," Response Under 37 CFR 1.116 filed Dec. 5, 2016 for U.S. Appl. No. 14/806,500, 12 pages.
Vendetti et al., "Systems and Methods for Controlling Luminaire Wireless Network Using Smart Appliance," U.S. Appl. No. 62/458,970, filed Feb. 14, 2017, 50 pages.
Extended European Search Report dated Aug. 25, 2016, for corresponding EP Application No. 14843796.5—1757, 6 pages.
Reed et al., "Systems and Methods That Employ Object Recognition," Notice of Allowance mailed Jul. 18, 2016, for U.S. Appl. No. 13/411,321, 15 pages.
Reed, "Apparatus and Method of Energy Efficient Illumination Using Received Signals," Office Action mailed Aug. 23, 2016, for U.S. Appl. No. 14/557,275, 23 pages.
Reed, "Asset Management System for Outdoor Luminaires," Office Action mailed Aug. 31, 2016, for U.S. Appl. No. 14/869,501, 15 pages.
Reed, "Electronic Control to Regulate Power for Solid-State Lighting and Methods Thereof," Office Action mailed Sep. 6, 2016 for U.S. Appl. No. 14/806,500, 18 pages.
Reed, "Low Power Photocontrol for Luminaire," Notice of Allowance mailed Aug. 24, 2016, for U.S. Appl. No. 14/844,944, 7 pages.

\* cited by examiner

APPARATUS AND METHOD FOR SCHEDULE BASED OPERATION OF A LUMINAIRE

BACKGROUND

Technical Field

The present disclosure generally relates to the field of illumination devices and, more particularly, to control dusk-to-dawn illumination.

Description of the Related Art

Energy conservation has become of ever increasing importance. Efficient use of energy can result in a variety of benefits, including financial benefits such as cost savings and environmental benefits such as preservation of natural resources and reduction in "green house" (e.g., $CO_2$) gas emissions.

Residential, commercial, and street lighting which illuminate interior and exterior spaces consume a significant amount of energy. Conventional lighting devices or luminaires exist in a broad range of designs, suitable for various uses. Lighting devices employ a variety of conventional light sources, for example incandescent lamps, florescent lamps such as high-intensity discharge (HID) lamps (e.g., mercury vapor lamps, high-pressure sodium lamps, metal halide lamps).

There appear to be two primary approaches to reducing energy consumption associated with lighting systems. One approach employs higher efficiency light sources. The other approach selectively provides light only when needed.

Use of higher efficiency light sources may, for instance, include replacing incandescent lamps with florescent lamps or even with solid-state light sources (e.g., light emitting diodes (LEDs), organic LEDs (OLEDs), polymer LEDs (PLEDs)) to increase energy efficiency. In some instances, these higher efficiency light sources may present a number of problems. For example, florescent light sources take a relatively long time after being turned ON to achieve their full rated level of output light or illumination. Such light sources also typically have a high energy consumption during warm-up. Many higher efficiency light sources emit light with a low color rendering index (CRI). For reference, sunlight has a CRI of 100 and represents "ideal light" which contains a continuous spectrum of visible radiation. Low CRI light is less pleasing to the human eye. Surfaces illuminate with low CRI light may not be perceived in their "true" color. Low CRI light makes it more difficult to discern details, often requiring a higher level of output light or illumination to discern details that would otherwise be discernable in high CRI light. Further, higher efficiency light sources may require additional circuitry (e.g., ballasts) and/or thermal management techniques (e.g., passive or active cooling).

Providing illumination only when needed can be achieved manually by a user of the lighting system, or automatically through the use of one or more control mechanisms. Automatic control mechanisms generally fall into two broad categories, timers and environmental sensors. Timer based control mechanisms turn light sources ON and OFF based on time. The times are typically user configurable and result in the luminaire turning ON for a period of time and then OFF for the remainder of a 24 hour period. Such timing circuits rely on the user to account for changes in length of daylight which may occur throughout a year by adjusting the ON period of the luminaire commensurate with the change in day length. Very often, timer based control mechanisms are set once and never updated.

Automatic control devices such as photosensitive transducers and motion or proximity sensors add to the cost of a light fixture and are frequently mounted in exposed positions where environmental or physical damage is unavoidable or vandalism may occur. In addition, a failure of the automatic control mechanism, for example failure of a photosensor used to turn the light source ON or OFF dependent upon the measured ambient light level may result in the light source remaining in a continuously ON state in the event the automatic control mechanism fails in a "closed" position permitting current flow to the light source or in a continuously OFF state in the event the automatic control mechanism fails in an "open" position interrupting current flow to the light source. Either failure mode results in an unacceptable mode of operation of the light source.

New approaches to improving the automated performance of lighting systems in the absence of one or more photosensitive devices are therefore needed.

BRIEF SUMMARY

Many conventional approaches employ a photosensitive transducer or light sensor (e.g., photodiode) to detect levels of light in the ambient environment. Such approaches often take the form of dusk to dawn controllers. In response to sensing ambient light levels consistent with a dusk condition, the controller turns on the associated light. In response to sensing ambient light levels consistent with a dawn condition, the controller turns off the associated light. These dusk to dawn controllers are prone to failure due to a variety of reasons, for example failure of the light sensor. The light sensor must be positioned so as to be exposed to ambient light while not being so exposed to the light emitted by the light source that the light sensor will sense a dawn event in response to the turning on of the associated light. Such places substantial limitations on the design and installation of luminaires. Additionally, the light sensor(s) add significant cost and complexity. Applicants disclose various embodiments that advantageously do away with a light sensor, yet realize the benefits obtainable via control of a light source in accordance with solar events (e.g., occurrence of a dusk or dawn event).

Solar and other astronomical events such as sunrise, sunset, solar noon, and solar midnight can be predicted with a high degree of accuracy for any given date and location on the surface of the Earth. Higher latitude geographic locations such as those proximate the Earth's poles will experience a greater variation throughout the diurnal cycle than lower latitude geographic locations proximate the Earth's equatorial regions. This natural cyclical variation in solar event times further complicates operating a light source in an energy efficient manner, particularly in the absence of some form of photosensitive transducer or similar photodetection capability.

A lighting system controller having at least one output controlling the flow of power to a light source can be used to control one or more operational aspects of the associated lighting system. The lighting system controller can use at least one method or algorithm to accurately determine solar event times for the geographic region in which the lighting system is located. In some instances, the lighting system controller can accurately predict solar event times using temporal or geolocation data that is manually or automatically obtained, accessed or collected from one or more external devices such as a cellular telephone, portable communication device, or satellite. In other instances, the lighting system controller can accurately predict solar event times using calculated or stored data, for example a date and time generated using a timer or clock circuit and stored geolocation data to calculate or look up solar event times.

A luminaire may be summarized as including at least one light source; and a control subsystem to control a supply of power to the at least one light source, the control subsystem including: at least one timing circuit to provide a timing signal; at least one nontransitory storage media to store information indicative of at least a local latitude in which the luminaire is to operate; a controller communicably coupled to the at least one timing circuit and the at least one nontransitory storage media, and that: determines at least one aspect of a scheduled solar event at the local latitude; and generates at least one output signal having at least one characteristic indicative of the determined at least one aspect of the scheduled solar event; and at least one power controller conductively coupled to the controller, the at least one power controller selectively operable to control a supply of power to the at least one light source responsive to the at least one characteristic of the at least one output signal.

The timing signal may include data indicative of at least one of: a current time and a current date. The information indicative of a local latitude in which the luminaire is to operate may include a lookup table that includes data indicative of an expected time of occurrence of the scheduled solar event at the local latitude. The at least one aspect of the scheduled solar event may include the expected time of occurrence of the scheduled solar event as determined by the control subsystem via the lookup table using at least one of: the current time and the current date. The at least one aspect of the scheduled solar event may include an expected time of occurrence of the scheduled solar event determined by the control subsystem via a calculation using at least one of: the current date, the current time, and the information indicative of a local latitude. The at least one aspect of the at least one output signal may be indicative of a change in an ambient light intensity associated with the scheduled solar event. The at least one scheduled solar event may include a sunset event and the at least one aspect of the at least one output signal may cause an increase in the luminous output of the light source. The at least one scheduled solar event may include a sunrise event and the at least one aspect of the at least one output signal may cause a decrease in the luminous output of the light source. The at least one output signal may include a pulse width modulated (PWM) signal; and the at least one characteristic of the at least one output signal may include at least one of: a frequency of the PWM signal or a pulse width of the PWM signal; at least one of the frequency of the PWM signal or the pulse width of the PWM signal varied to adjust the luminous output of the light source. The power controller may include at least one solid state switch and the at least one light source may include a solid state light source. The at least one timing circuit may include at least one of: real-time clock circuit and a timer circuit. The timing circuit may include a conductively coupled persistent power source. The at least one aspect of the scheduled solar event may include at least one of: a time of a sunset event; a time of a sunrise event; a time of a dusk event; a time of a dawn event; a time of a solar noon event; and a time of a solar midnight event.

A method of controlling the operation of at least one solid state light source may be summarized as including determining an occurrence of a scheduled solar event at a local latitude based on time without any reference to photometric sensing; generating at least one output signal having at least one characteristic indicative of the occurrence of at least one aspect of the scheduled solar event; and adjusting a luminous output of the at least one solid state light source responsive to the at least one characteristic of the at least one output signal.

Determining an occurrence of a scheduled solar event at a local latitude may include determining a time of occurrence of the scheduled solar event by selecting data indicative of the time of occurrence of the scheduled solar event from at least one lookup table. Determining an occurrence of a scheduled solar event at a local latitude may include calculating a time of the occurrence of the scheduled solar event based on at least one of: a current time and a current date. Generating the at least one output signal may include varying at least one of: a voltage, a current, a frequency, and a pulse width of the at least one output signal to adjust the luminous output of the at least one solid state light source.

A luminaire controller may be summarized as including a timing circuit including a persistent power source and at least one of a timer circuit and a real time clock, the timing circuit to provide a timing signal including data indicative of at least one of: a local date and a local time; an output communicably coupled to at least one power controller, the output to provide at least one output signal having at least one characteristic to the at least one power controller, the at least one characteristic of the at least one output signal adjusted relative to at least one aspect of at least one scheduled solar event; and at least one non-transitory storage media storing information indicative of at least a local latitude in which the luminaire is to operate, wherein the machine executable instructions cause the controller to: determine the at least one aspect of the scheduled solar event at the local latitude; and adjust the at least one characteristic of the at least one output signal relative to the determined at least one aspect of the scheduled solar event.

The information indicative of at least a local latitude in which the luminaire is to operate may include at least one lookup table including data indicative of the at least one aspect of the scheduled solar event at the local latitude; and the controller may determine the at least one aspect of the scheduled solar event via the at least one lookup table based on at least one of: the current date and the current time. The controller may determine the at least one aspect of the scheduled solar event via one or more calculations based on at least one of: the current date, the current time, and the local latitude.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known or well-documented solar or astronomical relationships such as the "sunrise equation" and well-known structures associated with luminaires, timing circuits, real time clock circuits, data look-up tables, and the like have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Additionally, the terms "lighting" and "illumination" are used herein interchangeably. For instance, the phrases "level of illumination" or "level of light output" have the same meanings. Also, for instance, the phrases "illumination source" and "light source" have the same meanings.

The headings and Abstract of the Disclosure provided herein are for convenience only and do not interpret the scope or meaning of the embodiments.

Figure 1:
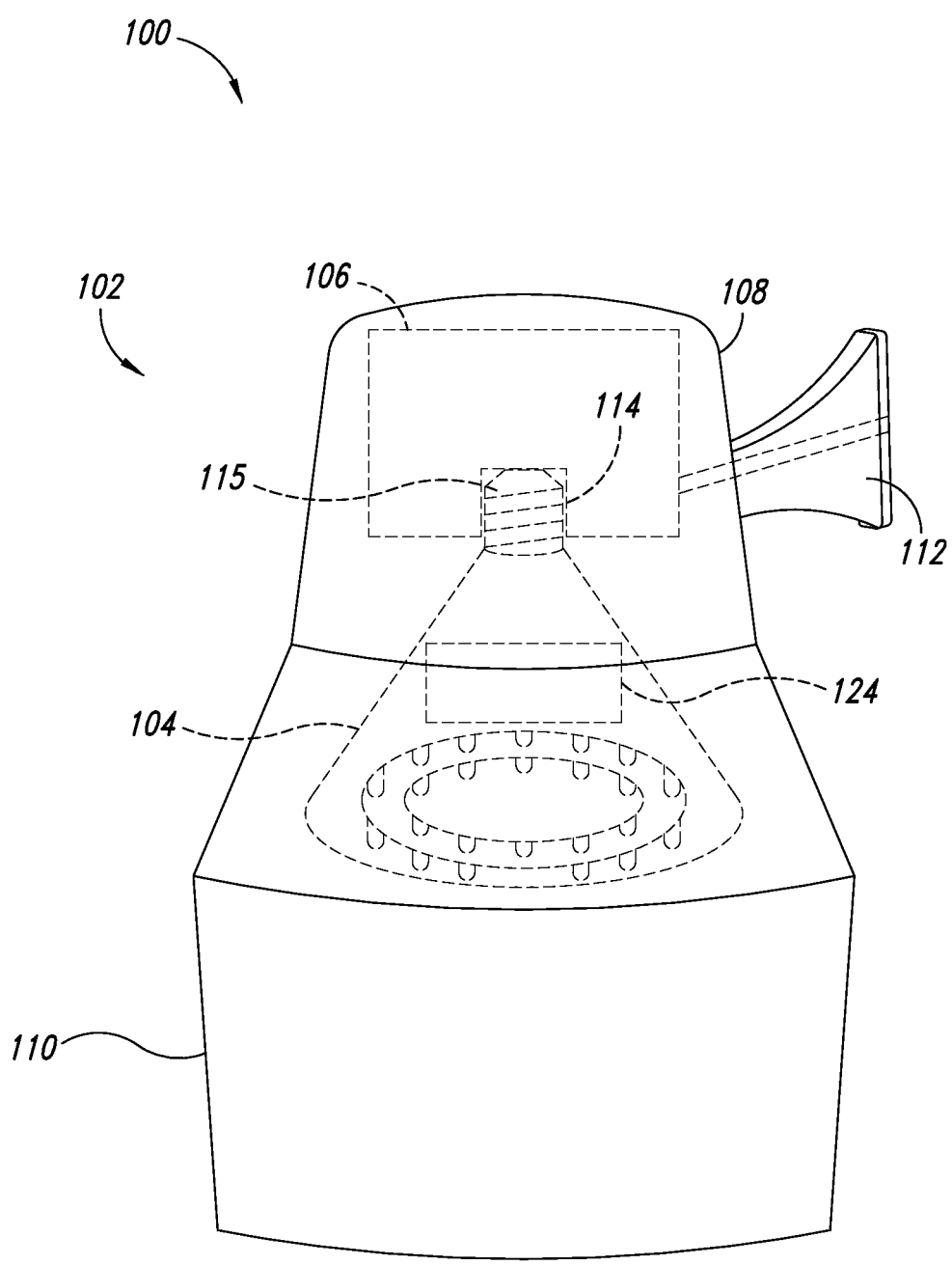
FIG. 1 is an isometric view showing a luminaire including a control subsystem and a light source, according to one non-limiting illustrated embodiment.

FIG. 1 shows an illumination system 100 according to one non-limiting illustrated embodiment. The illumination system 100 includes a luminaire 102, at least one illumination or light source 104, and a control subsystem 106.

The luminaire 102 may take any of a variety of forms. For example, the luminaire 102 may include a housing 108, one or more shades 110, and optionally one or more brackets 112 that allow the luminaire 102 to be suspended or otherwise supported by an external structure. The shade 110 may be transparent, translucent, or opaque. The luminaire 102 may include one or more sockets or receptacles, for instance a threaded socket or receptacle 114, sized to removably or interchangeably receive a base 115 of the light source 104. The luminaire 102 may include wiring (not called out) to supply power to the light source 104 from an external electrical power source such as an electrical power grid. Alternatively, the light source 104 may be integral to the luminaire 102, particularly where the light source 104 includes a plurality of solid-state light emitters and hence has a relatively long expected life cycle.

The control subsystem 106 may be integral to the luminaire 102. The control subsystem 106 also includes electrical circuitry or electronics that control or otherwise alter or adjust the power, luminosity or illumination state of the light source(s) 104, or control one or more functions of the luminaire 102. Such functions may include, but are not limited to adjusting the illumination level of the light source(s) 104 downward at a time after the light source is turned ON and adjusting the illumination level upward at a time preceding the light source being turned OFF. Such provides lighting at relatively high levels when illumination is typically most useful, while providing lighting at reduced levels when illumination is not typically useful, thereby reducing energy usage.

As described in more detail below, the control subsystem 106 may advantageously use one or more timers, timing circuits, or real time clocks to look-up or calculate the expected time of occurrence of one or more scheduled solar events and adjust the luminous output or intensity of the luminaire accordingly. Examples can include calculating or looking up an expected time of occurrence for a sunset event. In some instances such may include increasing the output of the luminaire from 0% (no luminous output) to 100% (full luminous output) at the expected time of occurrence of the sunset. In other instances such may include such may include incrementally increasing the output of the luminaire from 0% (no luminous output) to 100% (full luminous output) in increments (e.g., 5%) starting a defined period (e.g., 10 minutes) prior the expected time of occurrence of the sunset event and extending a defined period (e.g., 10 minutes) subsequent the expected time of occurrence of the sunset event.

The time of occurrence of various solar events (e.g., a sunrise event, a sunset event, a solar noon event, a solar midnight event, a dusk event, a dawn event) can be determined using one or more lookup tables containing data indicative of the times of occurrence for various solar events and stored in a nontransitory storage media that is accessible to the luminaire. The time of occurrence of various solar events may additionally or alternatively be calculated using geolocation, time, or date data either generated by or stored within the luminaire or obtained from one or more external devices via one or more wired or wireless communication interfaces.

Such geolocation, time, or date data may be used by the control subsystem 106 to adjust or otherwise confirm the accuracy of the one or more timers or real time clocks. Advantageously, the one or more timer or real time clock circuits may be used to alter, adjust, or otherwise control one or more operational aspects of the luminaire 102 using either calculated or looked-up data indicative of one or more scheduled solar events. Such a schedule driven operation is particularly attractive in instances where a photosensitive transducer or similar photosensitive device is not installed, not available, or otherwise not incorporated into the control subsystem 106 or where such photosensitive devices fail after installation. In at least some instances, the schedule driven operation may take into account the legislative changeover from Daylight Savings Time to Standard Time and vice versa.

The light source 104 may take a variety of forms. The light source may include one or more distinct light bulbs, lights or light emitters 122a-122n (only two called out in FIG. 1). For example, the light source 104 may take the form of one or more incandescent light bulbs. Also for example, the light source 104 may take the form of one or more florescent light bulbs such as HID light bulbs or lights or one or more arc lamps (collectively gas-discharge lamps). Advantageously, the light source 104 may take the form of one or more solid state light sources, for instance an array of light emitting diodes (LEDs), organic light emitting diodes (OLEDs), or polymer light emitting diodes (PLEDs). While illustrated as a bulb, the light sources do not necessarily have to be enclosed in a bulb structure. For example, the light sources may take the form of one-, two-, or even three-dimensional arrays of individual LEDs or strings of LEDs. Where appropriate, the light source 104 may also include one or more ballasts 124.

Other light source configurations may be used to equal effect. In one example a plurality of directional light sources 104 mounted on a common base and operated using a common control subsystem 106 may be used. In another example, a plurality of lamps may be communicably coupled together and the luminous output of each of the plurality of light sources 104 controlled as a group using a single control subsystem 106.

The control subsystem includes electrical circuitry or electronics that control operation in a similar or identical manner as discussed above in reference to FIG. 1, and as discussed below with reference to FIGS. 3-5.

Figure 2:
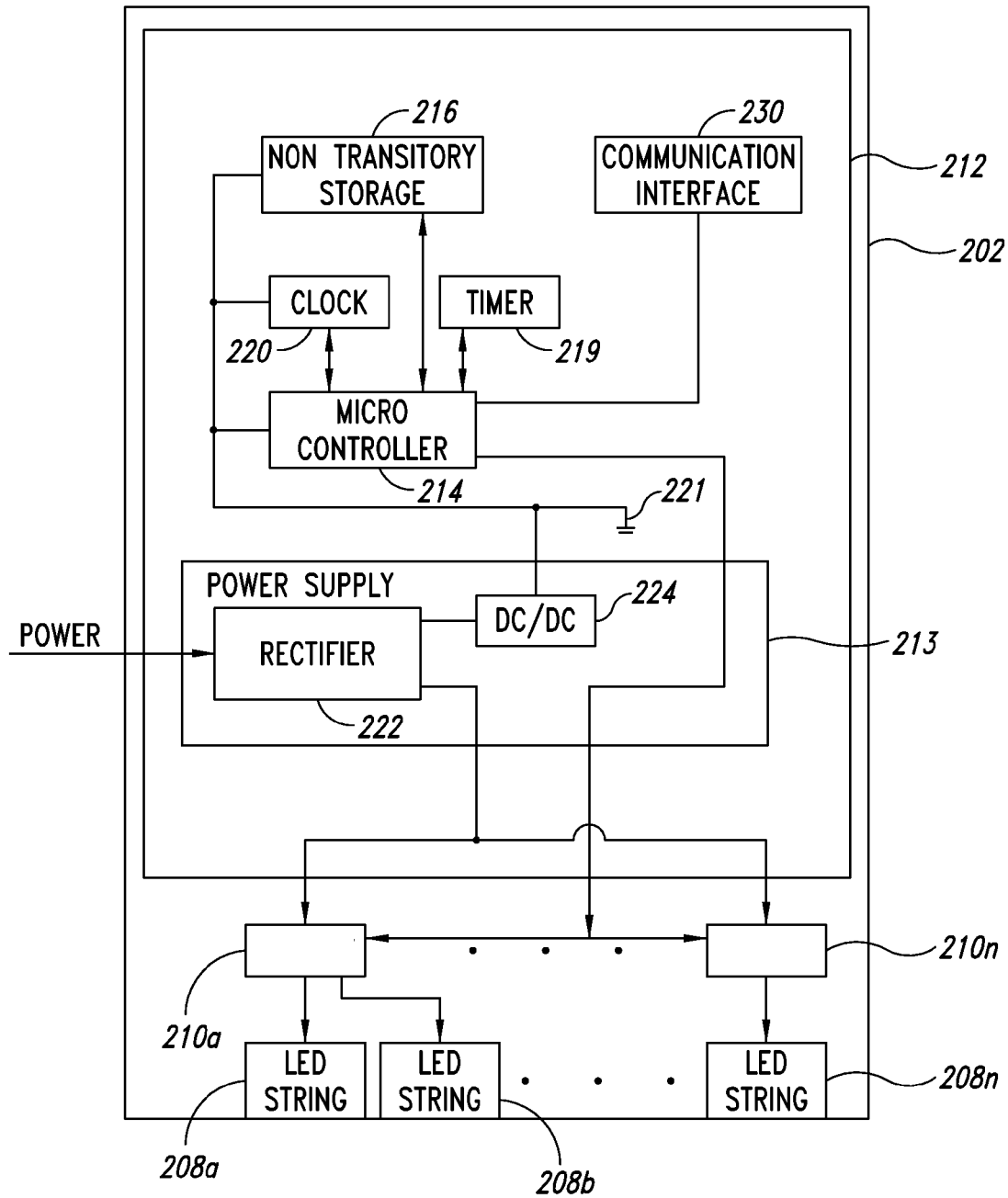
FIG. 2 is a schematic view showing a luminaire equipped with a control subsystem and a light source.

FIG. 2 illustrates a luminaire 202 including a control subsystem and light source, according to one non-limiting illustrated embodiments. The illumination system 200 may be identical or similar to the illumination system 100 (FIG. 1) or may have a physical configuration that differs in form but is similar in function to the illumination system 100 illustrated in FIG. 1. The illumination system 200 may employ one or more light sources 104 (only one illustrated in FIG. 2). In some instances, the illumination system 200 may include more than one luminaire 202.

The illumination system 200 includes one or more light sources, for example strings of series electrically coupled LEDs 208a-208n (collectively 208). The light sources 208 may be selectively removable or interchangeable from the luminaire 202. Alternatively, the light sources 208 may be an integral part of the luminaire 202. Various examples of suitable light sources 208 are described above. The illumination system 200 may optionally include one or more drivers 210a-210n (collectively 210) for the light sources 208. The ballasts 210 may form part of the control subsystem 212 or the luminaire 202. Alternatively, the ballasts 210 may be an integral or unitary part of the light sources 208.

The illumination system 200 includes a control subsystem 212 which may be integral to the luminaire 202. The control subsystem 212 may be identical or similar to the control subsystem 106 (FIG. 1). Notably, a photosensitive transducer to sense the varying levels (e.g., power or intensity) of one or more light conditions in the ambient environment about the luminaire 202 is not included, incorporated, or used as an input to the control subsystem 212. The control subsystem 212 may, for example, include a microcontroller 214 and one or more non-transitory storage media 216 communicatively coupled to the microcontroller 214.

The microcontroller 214 may take any of a variety of forms, for example a microprocessor, programmable gate array (PGA), application specific integrated circuit (ASIC), digital signal processor (DSP), etc. The microcontroller 214 may require very limited computing power, for example an 8-bit microcontroller may be sufficient. The microcontroller 214 may be communicatively coupled to receive signals directly from the photosensitive transducer 204.

In some instances, a single microcontroller 214 may be used to control a plurality of wiredly or wirelessly networked luminaires 202. In such instances, the luminaires 202 forming the network may be individually addressable or addressed as a group. In such an arrangement, the single microcontroller 214 may transmit various signals exercising control over individual operation of the luminaires 202 within the group or group control over operation of all of the luminaires 202 forming the group.

The at least one nontransitory storage media 216 may take any of a variety of forms, for example electrically erasable programmable read only memories (EEPROMs), flash memories, etc. In at least some instances, the at least one nontransitory storage media 216 may wholly or partially comprise removable storage media such as secure digital (SD) or compact flash (CF) cards, universal serial bus (USB) memory sticks, or similar. The at least one nontransitory storage media 216 may have sufficient capacity to store or otherwise retain one or more sets of machine executable instructions, year-long daily sunrise and sunset times at a number of latitudes, open storage for acquired data indicative of one or more solar events including data either internally generated by the control subsystem 212 or acquired from one or more external sources such as a network or handheld computing device. In some instances, the control subsystem 212 may automatically overwrite all or a portion of the data stored within the nontransitory storage media 216, for example every number N of daily cycles.

In at least some instances, the at least one nontransitory storage media 216 can store or otherwise retain a number of look-up tables containing astronomical or similar solar event data. Such astronomical or solar event data may include sunrise and sunset times, dusk and dawn times, solar noon and solar midnight times, and the like at least for the local latitude at which the luminaire is to operate. Additionally, in at least some instances the at least one nontransitory storage media 216 can store geolocation information specific to the position of the luminaire 206 on the surface of the Earth. Such geolocation data can include at least the latitude or other similar positioning information or coordinates that identifies the location of the luminaire 202 with respect to a pole or the equator or any similar fixed geographic reference point on the surface of the Earth. In some implementations the geolocation data may include the longitude in addition to the latitude. Longitude data may be useful, for example in determining a time zone (e.g., a time zone location referenced to a reference time or time zone such as coordinated universal time, UTC) in which the luminaire 202 is operating or programmed to operate. In some instances, dates and times corresponding to the conversion from daylight savings time to standard time (and vice-versa) may be stored within the nontransitory storage media 216 to permit the scheduled operation of the luminaire 202 to reflect such legislative time changes. Such geolocation, reference time, time zone, and daylight savings time data may be communicated to and stored in the nontransitory storage media 216, for example, using a portable handheld electronic device having global positioning capabilities and a communications link (wired or wireless, including RF, microwave or optical such as infrared) to the luminaire 212. Alternatively, geolocation, reference time, time zone, or daylight savings time information may be stored in a read-only portion of the at least one nontransitory storage media 216, for example when the luminaire 202 is manufactured, installed, commissioned, programmed or serviced.

The control subsystem 212 may include an integrated or discrete real time clock circuit 220. For example, an integrated real time clock integrated circuit such as the PCF2129A as manufactured by NXP Semiconductors (Eindhoven, The Netherlands) may be used in some instances. In at least some instances, the real time clock circuit 220 may be persistently powered, for example using one or more batteries, capacitors, ultracapacitors or similar energy storage devices. Other commercially available semiconductor chips providing real time clock functionality may be equally employed. Alternatively, the microcontroller 214 may implement a real time clock based on timing signals produced by a controller or processor clock or similar oscillator. The control subsystem 212 may further include a timer circuit 219 (e.g., a digital timing circuit or an analog timer circuit). In at least some instances, the timer circuit 219 may be persistently powered, for example using one or more batteries, capacitors, ultracapacitors or similar energy storage devices. The timer circuit 219 may produce control signals at defined periods following an occurrence of defined times as indicated by the real-time clock circuit 220 of the control subsystem 212.

As explained in detail below with reference to FIGS. 3-5, the microcontroller 214 may determine the time at which one or more ambient lighting conditions corresponding to a well defined astronomical event such as a sunrise or sunset event is scheduled or predicted to occur. In other instances, the microcontroller 214 may determine the time or time range at which one or more ambient lighting conditions corresponding to a less well defined astronomical event such as a dusk event or a dawn event is scheduled or predicted to occur. In some instances, the microcontroller 214 may employ a lookup table or other data structure containing data indicative of the scheduled, predicted or expected times of occurrence of one or more solar events. In other instances, the microcontroller 214 may calculate the scheduled, predicted or expected times of occurrence of one or more solar events using one or more equations, algorithms, relationships or correlations based at least in part on the latitude at which the luminaire 202 operates or is programmed to operate, the current date, the day in the solar cycle (e.g., day 106 of a 365¼ day cycle), or the Julian date. Various specific methods for performing such are described below.

The control subsystem 212 may include power supply circuitry 213 that rectifies, steps down a voltage and otherwise conditions supplied electrical power to a form suitable to power the microcontroller 214, nontransitory storage media 216 and/or other components of the control subsystem 212, as well as to power the light sources 208. The power supply circuitry 213 may supply power to the various components of the control subsystem 212. The power supply circuitry 213 may supply power to recharge the optional standby power source 221 (e.g., battery cells, button cells, capacitors, super- or ultracapacitors, fuel cell), which supplies power to the components of the control subsystem 212 when needed, for example in the event of loss of power from the grid or other external power source. For example, the standby power source 221 may supply power to the timer circuit 219 or the real time clock circuit 220 in instances where electrical power supplied by an electrical distribution grid or network is interrupted. The standby power source 221 may also provide sufficient power to maintain the current date, day in the solar cycle, or Julian date and the current time within the real time clock 220 during the luminaire manufacturing, shipping and installation process. In at least some instances, the current time can include a local time (i.e. the time in the time zone in which the luminaire is operating or intended to operate) or a universal time such as coordinated universal time (UTC). In at least some instances, where a universal time is used, one or more correction factors may be stored in the nontransitory storage media 216 to convert the universal time to a local time in which the luminaire is operating or intended to operate.

In some instances, the current time and current date may be the local time and the local date at the geographic location where the luminaire is installed or is intended for installation. Such local time and local date information may be stored within the nontransitory storage media 216 along with any local time changes (e.g., Daylight Savings time change-over dates and times), leap years, or other events affecting the local time or local date. Such current time/current date or local time/local date information may be periodically or continuously provided to or updated in the luminaire using one or more external electronic devices. For example, the current or local time or date may be periodically updated using an electronic device connected via a wired or wireless network, or a portable electronic device such as a cellular telephone, portable data assistant, tablet computer, or the like.

In particular, power supply circuitry 213 may include one or more rectifiers 222, DC/DC converters 224, isolation transformers, filters, smoothing capacitors, etc. to rectify, step a voltage and otherwise transform or condition electrical power from an external source into a form suitable to power the components of the control subsystem 212 and/or light sources 208. In some instances, the rectifier 222 can supply rectified DC voltage to the DC/DC converter 224 which supplies regulated DC voltage to all or a portion of the control subsystem 212. In other instances an AC/DC converter may be used to step a voltage down to a first level suitable for the control electronics of the control subsystem 212. An example AC/DC converter is a "capacitor dropping" type AC/DC converter including a moderately sized capacitor (e.g., 1 microfarad capacitor) and a rectifier or bridge rectifier including a capacitor and a half- or full-bridge rectifier.

The control subsystem 212 may employ a number of power controllers, switches, or other systems or devices configured to turn the light source 208 ON and OFF and/or to adjust the level of light output or luminosity of the light sources 208. In some situations, the power controllers may employ various switches, for example contact switches, relays, solid state switches, transistors, triacs or the like to control the flow of current or power to the light sources 214. In other situations, the number of power controllers may include one or more switched devices or systems, such as a switched mode power supply 213 or power converter, the output of which is controlled or adjusted based on at least one characteristic of the output signal provided by the microcontroller 214. In some instances, the light sources 208 can include one or more solid state light sources and the microcontroller 214 can provide one or more pulse wave modulated (PWM) output signals to the power supply 213, all or a portion of the number of power controllers, or both. In at least some instances, the luminosity of the solid state light sources 208 may be adjusted by controlling the duty cycle of the solid state light sources 208. For example, the overall duty cycle (and consequent luminous output) of the solid state light sources 208 may be adjusted by the control subsystem 212 by increasing or decreasing at least one of a PWM signal pulse width or a PWM signal frequency of the output signal provided to the power supply 213, a power converter supplying all or a portion of the power to the light sources 208, or all or a portion of the number of power controllers.

The rectifier 222 may also supply rectified DC voltage directly to one or more drivers 210a-n. In at least some instances, the drivers 210a-n can convert the input voltage to a constant current having parameters matched to the type of LEDs used in the LED strings 208a-n. A DC/DC converter 224, for example one or more DC/DC buck converters, may be used to power all or a portion of the drivers 210 powering the light sources 208. In addition, in some instances, the microcontroller 214 can provide a control input to at least a portion of the drivers 210a-n. Such driver control inputs can enable a power ON or a power OFF to the LED strings 208a-n, provide a dimming input to the LED strings 208a-n, or combinations thereof. For example, the control input provided by the microcontroller 214 to the drivers 210a-n may be a pulse width modulation (PWM) signal to cause the drivers 210a-n to apply the constant current for a first period of time and not apply the constant current for a second period of time. In at least some instances, a plurality of LED strings 208a-n may be driven by a single driver 210.

In at least one embodiment, an AC/DC switched-mode power converter having digital input capabilities may be used to provide all or a portion of the power to the light sources 208. In such instances, the control signal provided by the microcontroller 214 may be used to selectively control the operation of the AC/DC switched mode converter. For example, an IRS2548D SMPS/LED Driver PFC+ Half-Bridge Control IC as manufactured by International Rectifier Corp. (Los Angeles, Calif.) may be used to control the flow of power to the light sources 208 using the output signal from the microcontroller 214. In such instances, the presence of a low output signal (e.g., a digital "0" signal) from the microcontroller 214 may permit the flow of current to the light sources 208 while the presence of a high output signal (e.g., a digital "1" signal) from the microcontroller 214 may inhibit the flow of current to the light sources 208.

As used herein and in the claims, adjusting an illumination level includes turning ON a light source from an OFF state in which no light or illumination is produced to an ON state at which at least some light or illumination is produced. As used herein and in the claims, adjusting an illumination level includes turning OFF a light source from an ON state in which at least some light or illumination is produced to an OFF state at which no light or illumination is produced.

As used herein and in the claims, adjusting an illumination level also includes increasing and/or decreasing a level of light or illumination produced. Such may include adjusting an output level for any given discrete light source. Such may additionally or alternatively include adjusting a total number of light sources that are in the ON state. For example, a first and second set or strings of light sources may be used to produce a first level of light or illumination, while only the first set or string of light sources may be used to produce a second level of light or illumination. Also for example, a first number of light sources in a first set or string may be used to produce the first level of light or illumination, while a smaller number or subset of light sources in the first set or string may be used to produce the second level of light or illumination.

One or more wired or wireless communications interfaces 230 may be disposed within the control subsystem 212. Such communications interfaces 230 may include, but are not limited to one or more optical (e.g., infrared), wired (e.g., IEEE 802.3, Ethernet, etc.) or wireless (e.g., IEEE 802.11—WiFi®; cellular—GSM, GPRS, CDMA, EV-DO, EDGE, 3G, 4G; Bluetooth®; ZigBee®; Near Field Communications; etc.) communication interfaces. The one or more communication interfaces 230 may be communicably coupled to the microcontroller 214 or the at least one nontransitory storage media 216 and can be useful in bidirectionally exchanging data between the control subsystem 212 and one or more external devices. In some instances, the one or more communication interfaces 230 may provide the control subsystem 212 in a first luminaire 202 with the ability to unidirectionally or bidirectionally communicate with the control subsystem 212 in a number of other luminaires 202.

The one or more wired or wireless communications interfaces 230 facilitate the transfer of data indicative of a current time, a universal time (e.g., Coordinated Universal Time, UTC), a current date, a current day of the solar cycle (e.g., day 213 of a 365¼ solar cycle), a Julian date, or combinations thereof. The one or more wired or wireless communications interfaces 230 may facilitate the transfer of data indicative of one or more sets of machine executable instructions used by the microcontroller 214. The one or more wired or wireless communications interfaces 230 may facilitate the transfer of data indicative of one or more sets of operational code such as firmware useful in supporting the operation of the control subsystem 212.

The operation of the luminaire 202 is controlled using at least one time based schedule, formula, calculation, or equation that is indicative of at least one scheduled, predicted, or expected aspect of one or more solar events. Time based schedules may include looked-up data, for example data indicative of a sunrise or sunset event that is looked-up based on one or more signals received from the timer circuit 219 or real time clock circuit 220. Time based schedules may include calculated data, for example data indicative of a sunrise or sunset event that is calculated based on the latitude of operation of the luminaire 202 and one or more signals received from the timer circuit 219 or real time clock circuit 220. In either event, the control subsystem 212 may be used to control the operation of the luminaire 202 based at least in part on current date, day in the solar cycle, Julian date, time, or latitude data stored in the nontransitory storage media 216. Such data may be stored in the nontransitory storage media 216 at the time of installation or commissioning of the luminaire 202. The microcontroller 214 can use the stored date, day in the solar cycle or Julian date, time, or latitude data along with a time-keeping circuit such as the timer circuit 219 or the real time clock circuit 220 to either calculate (e.g. using the sunrise equation) or look-up (e.g. using one or more latitude indexed lookup tables stored in the nontransitory storage media 216) the scheduled, predicted or expected times for various solar events for the location of the luminaire 202.

Figure 3:
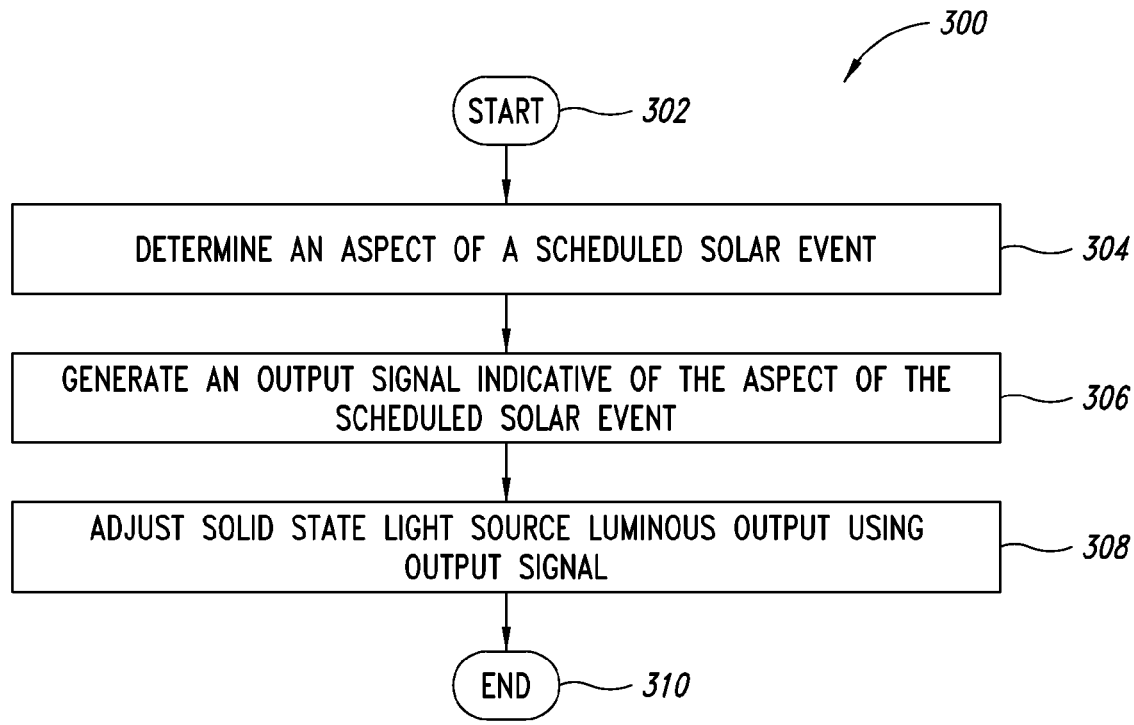
FIG. 3 is a flow diagram showing a high level method of operating an illumination system to provide illumination in the event of a photosensor failure, according to one non-limiting illustrated embodiment.

FIG. 3 shows a high level method 300 of operating an illumination system to provide illumination employing a scheduled, predicted or expected time of a solar event. The scheduled, predicted or expected time may be determined, for example, via look-up or via a calculated formula or equation. The high level method 300 may be rendered as one or more sets of machine executable instructions at least partially stored in the at least one nontransitory storage media 216 and executed by the microcontroller 214 or implemented in other logic or a hardwired circuit.

One or more operational aspects of the luminaire 202, such as the luminous output of the light source 208, may be controlled in whole or part by comparing a current time or date, day in the solar cycle, or Julian date signal generated using a timer or real time clock with the scheduled, predicted or expected time of occurrence of a solar event. The scheduled, predicted or expected time of occurrence of a solar event may, in some instances, be determined by the microcontroller 214 by selecting or looking up data in the nontransitory storage media 216 using the date, day in the solar cycle, or Julian date or time signal provided by the timer circuit 219 or real time clock circuit 220. The scheduled, predicted or expected time of occurrence of a solar event may, in other instances, be determined by the microcontroller 214 by calculating such based at least in part on latitude data and the date, day in the solar cycle, or Julian date or time signal provided by the timer circuit 219 or real time clock circuit 220. In either event, the control subsystem 212 may be used to control the operation of the luminaire 202 based at least in part on current date, day in the solar cycle, or Julian date, time, and/or latitude data which may be stored in the nontransitory storage media 216. The method commences at 302.

At 304, at least one aspect of a solar event is determined without reference to any photometric data. Such aspects may include the scheduled, predicted or expected time of occurrence of a solar event such as a sunrise, a sunset, a solar noon, or a solar midnight. Such aspects may also include an estimation or heuristic determination of an expected change or an expected rate of change in one or more physical, optical, or electromagnetic conditions associated with the occurrence of a solar event. For example, such aspects may include an estimate or approximation of the expected rate of decrease in ambient light level during an expected sunset event or an estimate of the expected rate of increase in ambient light level during an expected sunrise event.

Such aspects may also or alternatively include determination of times precedent or subsequent to one or more expected solar events. For example, such aspects may include one or more calculated values useful in adjusting the luminous output of the light sources 208 at a time precedent or subsequent to the expected or scheduled time of occurrence of a solar event. For example, reducing the luminous output of the light sources 208 from 100% to 50% a defined period (e.g., six hours) after the scheduled, predicted or expected time of occurrence of a sunset event and increasing the luminous output of the light sources 208 from 50% to 100% a defined period (e.g., four hours) prior to the scheduled, predicted or expected time of occurrence of a sunrise event.

In at least some instances, such aspects may be determined using data indicative of the current time and/or date, day in the solar cycle, or Julian date as determined by the timer circuit 219 or the real time clock circuit 220. In at least some instances, the timer circuit 219 or the real time clock circuit 220 may include one or more persistently powered circuits to maintain an accurate system time in the event power to the luminaire 202 is interrupted. In at least some instances, the timer circuit 219 or the real time clock circuit 220 may be adjusted, set, or otherwise synchronized to the current time and date in which the luminaire 202 will operate during manufacture, installation, commissioning, programming or servicing. In some instances the data indicative of the current time or date may be provided to the microcontroller 214 from an external network, system, or device using the communications interface 230. In some instances, data indicative of a current or reference time (e.g., Greenwich mean time, National Institute of Standards atomic clock time, or the like) and/or date, day of the solar cycle, or Julian date may be provided to the control subsystem via one or more signals transmitted across the power grid to which the luminaire 202 is coupled. Advantageously, the use of a persistently powered timer circuit 219 or real time clock circuit 220 provides the microcontroller 214 with access to data indicative of the time and/or date, day of the solar cycle, or Julian date without requiring resetting the date and time after every interruption in power to the luminaire 202.

Providing the time and/or date, day of the solar cycle, or Julian date to the microcontroller 214 permits the synchronization of luminous output from light source 208 with the scheduled, predicted or expected times of occurrence of one or more solar events.

At 306, the microcontroller 214 can generate at least one output signal having at least one characteristic indicative of the at least one aspect of the scheduled, predicted or expected solar event. In one example, if the at least one aspect of the solar event is a scheduled, predicted or expected time of occurrence of the solar event (e.g., a sunset event occurring at 7:34 P.M.) the microcontroller 214 can generate an output signal having at least one characteristic representative of the at least one aspect of the solar event (e.g., voltage of the output signal decreases from 5 D.C. volts ("VDC") to 0 VDC at 7:34 P.M. causing the light source 208 to illuminate).

In another example, the at least one aspect of the solar event may be an estimated or heuristically determined rate of decrease in ambient illumination associated with the solar event. Such may take the form of a heuristic relationship, for example a sunset event occurring at 7:34 P.M. causing a decrease in ambient light starting at 7:34 P.M., lasting approximately 25 minutes and ending at 7:59 P.M. Using the heuristic relationship, the microcontroller 214 may generate a "scheduled brightening" output signal having at least one characteristic (e.g., PWM signal pulse width) that is adjusted based on the at least one aspect of the solar event (e.g., rate of decrease in ambient light level) resulting in, for example an increase in a duty cycle of a PWM signal at a fixed rate (e.g., 4% per minute) starting at a 0% duty cycle at 7:34 P.M. and ending at a 100% duty cycle at 7:59 P.M.

In another example, the determined, calculated, or expected time of a solar sunrise event may be 6:43 A.M. The microcontroller 214 may generate a "scheduled dimming" output signal having at least one characteristic (e.g., PWM signal pulse width) that is adjusted based on the at least one aspect of the solar event (e.g., rate of increase in ambient light level). Such may result, for example in a PWM signal at 100% duty cycle decreasing at a fixed rate (e.g., 4% per minute) starting at 6:18 A.M. and ending twenty five minutes later at 6:43 A.M. with the PWM signal duty cycle at 0%. Other relationships between one or more output signal characteristics and the at least one aspect of the scheduled, predicted or expected solar event may be similarly defined.

At 308, the output signal is provided by the microcontroller 214 directly or indirectly to, for example all or a portion of the number of power controllers 226. In some instances, the output signal provided by the microcontroller 214 can cause the selective operation of one or more systems or devices controlling or otherwise limiting or adjusting the flow of power to the light sources 208. For example, in one instance, the output signal may be provided to the power supply 213 to control the power output provided to the light sources 208. In another example, the output signal may be provided to all or a portion of the number of power controllers 226 to interrupt, adjust, control or limit the flow of power to the light sources 208. For example, increasing the voltage of the output signal may cause all or a portion of the number of power controllers 226 to close, thereby permitting power to flow from a power grid to the light sources 208. In some instances, one or more characteristics of the output signal may be used to limit, alter, adjust, or otherwise control the quantity of power that flows from a power grid to the light sources 208. In other embodiments, all or a portion of the output signal itself may be used power at least a portion of the light sources 208. The method 300 concludes at 310. In some implementations, the method 300 will either continuously or periodically repeat, either with or without terminating.

Figure 4:
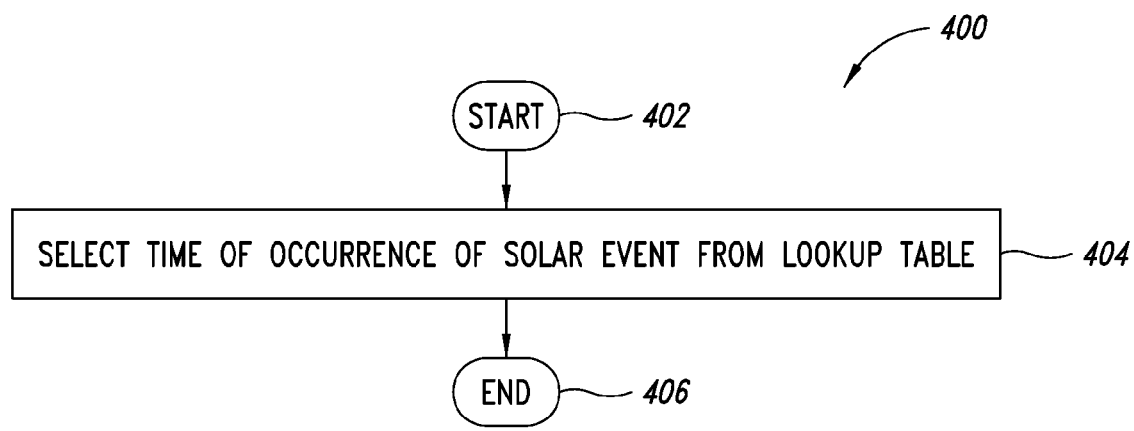
FIG. 4 is a flow diagram showing a low level method of determining a time of occurrence of a solar event using a lookup table, according to one non-limiting illustrated embodiment.

FIG. 4 shows a low level method 400 of determining a scheduled, predicted or expected time of occurrence for one or more solar events, such as a sunrise, a sunset, a solar noon, a solar midnight, and the like using a lookup table. The lookup table may contain data indicative of the scheduled, predicted or expected time of occurrence of one or more solar events at the latitude at which the luminaire 202 operates, is programmed or is expected to operate. The lookup table may or may not include similar data for other geographic locations (e.g., other latitudes, cities, countries, or similar geographic locations). The at least one nontransitory storage media 216 may include stored data that is directly or indirectly indicative of at least a local latitude at which the luminaire 202 will operate. The data indicative of a latitude is preferably stored in a nonvolatile memory from which it can be read and possibly updated. The nonvolatile memory may for instance take the form of read only memory (ROM), electrically erasable programmable read only memory (EEPROM), flash or other nonvolatile memory device. In some instances a portion of the nonvolatile memory can take the form of removable storage media, such as secure digital (SD) or compact flash (CF) media. Such data may include data indicative of the actual or expected latitude of operation of the luminaire 202. The stored data may also include data indicative of the expected times of occurrence of one or more scheduled, predicted or expected solar events which indirectly provides data indicative of an actual or expected latitude of operation of the luminaire 202. Such data may be stored within the nontransitory storage media 216 during the manufacturing process, prior to sale, or during installation, commissioning, programming, or maintenance of the luminaire 202.

Data indicative of the latitude at which the luminaire 202 will operate may be manually stored in the nontransitory storage media 216 for example at the sale of or during installation or commissioning of the luminaire 202. Such data may be autonomously or semi-autonomously stored in the nontransitory storage media 216 using one or more external data sources. In one example, data indicative of the local latitude at which the luminaire 202 operates may be acquired or otherwise obtained from a global positioning system (GPS) enabled electronic device communicably coupled to the luminaire 202 via the communication interface 230. In another example, data indicative of the local latitude at which the luminaire 202 operates may be acquired or otherwise obtained from a network of devices communicably coupled to the luminaire 202 via the wired or wireless communication interface 230. Such data may also be periodically updated, using similar manual, semi-automatic or automatic methods. Such methods may be useful in determining the at least one aspect of the solar event at 304. The method 400 commences at 402.

At 404, the microcontroller 214 selects data indicative of at least one aspect of a solar event from one or more lookup tables stored in the nontransitory storage media 216. In some instances, the one or more lookup tables may include one or more lookup tables populated with data specific to the latitude at which the luminaire 202 operates. In other instances, the one or more lookup tables may include data specific to a number of latitudes and the microcontroller 214 can select data from a lookup table having the actual or the geographically closest latitude to the actual latitude of operation of the luminaire 202.

The data included in the lookup table and selected by the microcontroller 214 may include at least the expected time of occurrence of the scheduled, predicted or expected solar event. The data in the lookup table selected by the microcontroller 214 may also include additional data related to the scheduled, predicted or expected solar event. For example, the data included in the lookup table may include one or more historical values indicative of the overall level of ambient light at the scheduled, predicted or expected time of occurrence of the scheduled solar event. In another example, the data in the lookup table may include historical values indicative of the rate of change of the ambient light at the scheduled, predicted or expected time of occurrence of the scheduled solar event. Such data may be advantageously used by the microcontroller 214 to alter, adjust, limit, or control the luminosity of the light sources at 308 responsive to the scheduled, predicted or expected time of occurrence of the solar event. Such data may be advantageously used by the microcontroller 214 to sequentially stage the brightening or dimming of the light sources 208 in conjunction with the historical loss or gain of ambient light during the solar event. The method 400 concludes at 406.

Figure 5:
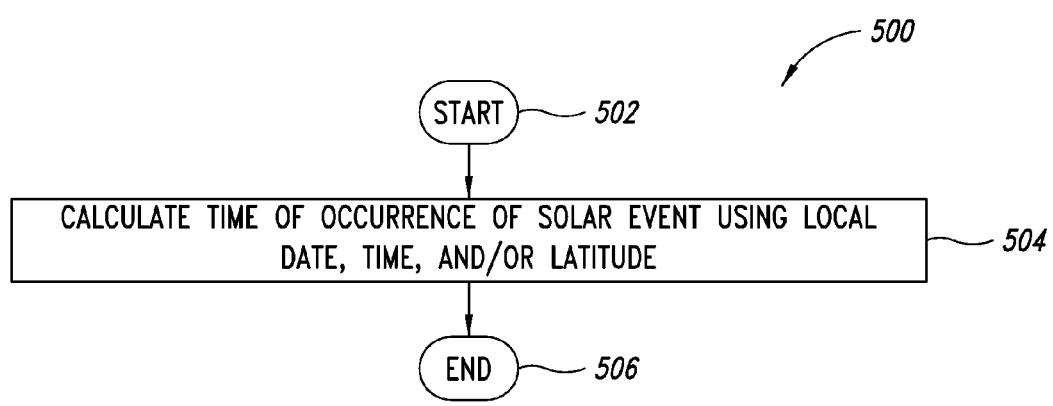
FIG. 5 is a flow diagram showing a low level method of determining a time of occurrence of a solar event using a calculation, according to one non-limiting illustrated embodiment.

FIG. 5 shows a low level method 500 of determining scheduled, predicted or expected times for solar events such as sunrise, sunset, solar noon, solar midnight and the like based on a calculated value indicative of the scheduled, predicted or expected time of occurrence of one or more solar events at the latitude at which the luminaire 202 operates or is programmed to operate. The at least one nontransitory storage media 216 includes stored data that is directly or indirectly indicative of at least a local latitude at which the luminaire 202 operates or is programmed to operate. Such data may be stored within the nontransitory storage media 216 during the manufacturing process, prior to or at sale, during installation, commissioning, programming, or maintenance of the luminaire 202.

Data indicative of the current time or date, day in the solar cycle or Julian date at which the luminaire 202 operates is provided to the microcontroller 214. Such data indicative of the current time or current date, day in the solar cycle, or Julian date may be provided by one or more timer circuits 219 or one or more real time clock circuits 220. Upon receipt of the data indicative of the current time or current date or day, and using the data indicative of the latitude at which the luminaire 202 operates, the microcontroller 214 calculates one or more scheduled, predicted or expected times of occurrence of one or more solar events.

In some instances, the data indicative of the current time or current date, day of the solar cycle or Julian date may be provided via one or more timers or time keeping circuits, systems or devices external to the control subsystem 204. For example, data indicative of the current time and date, day in the solar cycle, or Julian date may be provided to the microcontroller 214 from an external system, device, or network communicably wiredly or wirelessly coupled to the luminaire 202 via the communications interface 230. A current or universal time may be provided to the luminaire 202, for example by a radio frequency (RF) clock signal (e.g., 60 kHz NIST Time Signal), an Internet clock signal (e.g., from the NIST or U.S. Naval Observatory websites), a cellular carrier signal, a GPS clock or positioning signal, a terrestrial wired signal such as a timing signal carried on the power grid, or similar. The receipt of such time, date, day of the solar cycle, or Julian date signals may be communicated to the luminaire 202 via the wired or wireless communications interface 230, or via a dedicated wired or wireless receiver or transceiver communicably coupled to the control subsystem 212. The method 500 commences at 502.

At 504, the microcontroller 214 calculates a scheduled, predicted or expected time of occurrence of a solar event. Such calculations may, for example, make use of the sunrise equation or similar astronomical relationships that enable the calculation or determination of a scheduled, predicted or expected time of occurrence of a solar event based on the latitude and current time or date, day in the solar cycle or Julian date where the luminaire 202 operates or is programmed to operate. Such may permit the microcontroller 214 to increase the luminous output of the luminaire 202 at a current time coinciding with a scheduled, predicted or expected time of occurrence of a scheduled solar event (e.g., a sunset or dusk event). Such may also permit the microcontroller 214 to decrease the luminous output of the luminaire 202 at a current time coinciding with the scheduled, predicted or expected time of occurrence of a scheduled solar event (e.g., a sunrise or dawn event).

In some instances, one or more calculations or heuristic relationships may be used to determine an expected ambient light level at the scheduled, predicted or expected time of occurrence of a solar event. In another instance, one or more calculations or heuristic relationships may be used to determine the expected rate of change of the ambient light level at the scheduled, predicted or expected time of occurrence of the solar event. Such data may be advantageously used by the microcontroller 214 to alter, adjust, limit, or control the luminosity of the light sources at 308 responsive to the scheduled, predicted or expected time of occurrence of the solar event. Such data may be advantageously used by the microcontroller 214 to sequentially stage the brightening or dimming of the light sources 208 in conjunction with the historically observed loss or gain of ambient light associated with the solar event. The method 500 concludes at 506.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other contexts, not necessarily the exemplary context of controlling operations of an illumination system generally described above.

For example, while the illumination systems are generally described above as embodied in a luminaire, the control subsystem may control multiple luminaires. As used herein and in the claims, "luminaire" is used in its broadest sense to refer to any lighting fixture or structure. While a single step adjustment downward and upward in the level of illumination has been described and illustrated, illumination level may be adjusted in multiple steps, or even continuously to gradually ramp downward some time after turning ON the light source, then eventually back upward some time before turning OFF the light source. Additionally, or alternatively, the embodiments described herein may be combined with motion or proximity detecting, either as implemented by a luminaire control mechanism or by a retrofit or integral control subsystem.

The microcontroller 214 may be programmable and may include one or more input ports (not illustrated) through which a user can program the microcontroller 214. Such input ports may be wired or wireless ports. Example wired input ports include universal serial bus (USB), IEEE 1394 (FireWire®), or proprietary bus connectors. In some instances, such input ports may include an interface communicably coupled to the power grid such that one or more signals may be driven across the power grid. For example, the time delays and the various illumination levels of the at least one solid-state light source 308 may be programmed. The input port may include switches and/or potentiometers that can be used to set, alter, adjust, or program the microcontroller 214. Alternatively, the input port may include an electrical interface for the user to remotely program the microcontroller 314 whether through a wire or wirelessly. In one embodiment, the input port may be the ambient light sensor which is connected to the microcontroller 214. In one embodiment, the microcontroller 214 is programmable optically via one or more images captured by an image capture device or imager (not illustrated). In one embodiment, printed barcode pages are used to set delay times and other parameters used by the microcontroller 214. The microcontroller 214 may also receive a one-bit input via the input port to activate or deactivate the light source. For example, a binary bit of "0" turns OFF the light source 104 and a binary bit of "1" turns ON the light source.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

Also for example, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by one or more controllers (e.g., microcontrollers), as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure. For example, the control subsystem may include an analog electronic delay circuit such as a capacitor based timer circuit with defined delay times, to implement one or more of the specific adjustment times (e.g., times as indicated by the clock when light sources will be turned ON, decreased output, increased output, turned OFF).

When logic is implemented as software and stored in memory, logic or information can be stored on any computer-readable medium for use by or in connection with any processor-related system or method. In the context of this disclosure, a memory is a computer-readable storage medium that is an electronic, magnetic, optical, or other physical device or means that non-transitorily contains or stores a computer and/or processor program. Logic and/or information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 13/558,191, filed Jul. 25, 2012; U.S. Pat. No. 8,118,456; U.S. Patent Publication No. US 2009/0284155, published Nov. 19, 2009; U.S. Patent Publication No. US 2010/0090577, published Apr. 15, 2010; U.S. Provisional Patent Application No. 61/052,924, filed May 13, 2008; U.S. Provisional Patent Application No. 61/088,651, filed Aug. 13, 2008; U.S. Provisional Patent Application No. 61/154,619, filed Feb. 23, 2009; U.S. Provisional Patent Application No. 61/180,017, filed May 20, 2009; U.S. Provisional Patent Application No. 61/229,435, filed Jul. 29, 2009; U.S. Non-Provisional patent application Ser. No. 12/619,535, filed Nov. 16, 2009; U.S. Provisional Patent Application No. 61/295,519 filed Jan. 15, 2010; U.S. Non-Provisional patent application Ser. No. 12/769,956, filed Apr. 29, 2010; U.S. Provisional Patent Application Ser. No. 61/333,983, filed May 12, 2010; U.S. Nonprovisional patent application Ser. No. 12/784,091, filed May 20, 2010; U.S. Provisional Patent Application Ser. No. 61/346,263, filed May 19, 2010; and U.S. Nonprovisional patent application Ser. No. 13/604,327, filed Sep. 5, 2012, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:
1. A luminaire, comprising:
at least one light source;
at least one luminaire processor operatively coupled to the at least one light source;
at least one luminaire transceiver operatively coupled to the at least one luminaire processor and to at least one data communications channel; and
at least one luminaire nontransitory processor-readable storage medium operatively coupled to the at least one luminaire processor and which stores at least one of data or instructions which, when executed by the at least one luminaire processor, cause the at least one luminaire processor to:
  receive, via the at least one luminaire transceiver, geolocation information from an external device over the at least one data communications channel, the geolocation information indicative of a geographical location of the external device when the external device is positioned proximate the luminaire;
  store the received geolocation information in the at least one nontransitory processor-readable storage medium as luminaire geolocation information for the luminaire, the luminaire geolocation information indicative of a position of the luminaire on a surface of the Earth;
  receive, via the at least one luminaire transceiver, reference time data from an external device over the at least one data communications channel;
  store the received reference time data in the at least one nontransitory processor-readable storage medium;
  determine at least one solar event time without utilizing a photosensitive transducer based at least in part on the received geolocation information and the received reference time data; and
  control the operation of the at least one light source based at least in part on the determined at least one solar event time.

2. The luminaire of claim 1 wherein the luminaire processor:
receives geolocation information from an external device, the geolocation information includes at least latitude data.

3. The luminaire of claim 1 wherein the luminaire processor:
receives geolocation information from an external device, the geolocation information includes at least longitude data.

4. The luminaire of claim 1 wherein the luminaire processor:
receives, via the at least one luminaire transceiver, geolocation information from an external device, the external device including at least one of a cellular telephone, a portable data assistant, or a tablet computer.

5. The luminaire of claim 1 wherein the luminaire processor:
receives, via the at least one luminaire transceiver, geolocation information from an external device over the at least one data communications channel, the at least one data communications channel comprises a wireless data communications channel.

6. The luminaire of claim 1 wherein the luminaire processor:
receives, via the at least one luminaire transceiver, geolocation information from an external device over the at least one data communications channel, the at least one data communications channel comprises a WiFi®, Bluetooth®, ZigBee®, or Near Field Communications (NFC) channel.

7. The luminaire of claim 1 wherein the luminaire processor:
receives, via the at least one luminaire transceiver, geolocation information from an external device over the at least one data communications channel, the geolocation information comprises GPS data provided by a GPS receiver associated with the external device.

8. A method of operation for a luminaire, the method comprising:
receiving, by at least one luminaire transceiver of the luminaire, geolocation information from an external device over at least one data communications channel, the geolocation information indicative of a geographical location of the external device when the external device is positioned proximate the luminaire;
storing, by at least one luminaire processor of the luminaire, the received geolocation information in at least one nontransitory processor-readable storage medium of the luminaire as luminaire geolocation information for the luminaire, the luminaire geolocation information indicative of a position of the luminaire on a surface of the Earth;
receiving, via the at least one luminaire transceiver, reference time data from an external device over the at least one data communications channel;
storing, by the at least one luminaire processor, the received reference time data in the at least one nontransitory processor-readable storage medium;
determining, by the at least one luminaire processor, at least one solar event time without utilizing a photosensitive transducer based at least in part on the received geolocation information and the received reference time data; and
controlling, by the at least one luminaire processor, the operation of the at least one light source based at least in part on the determined at least one solar event time.

9. The method of claim 8 wherein receiving geolocation information from an external device over at least one data communications channel comprises receiving geolocation information from an external device, the geolocation information includes at least latitude data.

10. The method of claim 8 wherein receiving geolocation information from an external device over at least one data communications channel comprises receiving geolocation information from an external device, the geolocation information includes at least longitude data.

11. The method of claim 8 wherein receiving geolocation information from an external device comprises receiving geolocation information from at least one of a cellular telephone, a portable data assistant, or a tablet computer.

12. The method of claim 8 wherein receiving geolocation information from an external device comprises receiving geolocation information over a wireless data communications channel.

13. The method of claim 8 wherein receiving geolocation information from an external device comprises receiving geolocation information over at least one of a WiFi®, Bluetooth®, ZigBee®, or Near Field Communications (NFC) channel.

14. The method of claim 8 wherein receiving geolocation information from an external device comprises receiving GPS data provided by a GPS receiver associated with the external device.

* * * * *